(12) United States Patent
Ripley et al.

(10) Patent No.: US 11,989,676 B2
(45) Date of Patent: May 21, 2024

(54) RISK MANAGEMENT DATA CHANNEL INTERLEAVED WITH ENTERPRISE DATA TO FACILITATE ASSESSMENT RESPONSIVE TO A RISK EVENT

(71) Applicant: Certinia Inc., San Jose, CA (US)

(72) Inventors: Paul Shane Ripley, Burnt Yates (GB); Simon Kristiansen Ejsing, Redmond, WA (US); Daniel Christian Brown, Bellevue, WA (US); Matthew Lowell Cox, Walnut Creek, CA (US)

(73) Assignee: Certinia Inc., San Jose, CA (US)

( * ) Notice: Subject to any disclaimer, the term of this patent is extended or adjusted under 35 U.S.C. 154(b) by 0 days.

(21) Appl. No.: 16/866,285

(22) Filed: May 4, 2020

(65) Prior Publication Data
US 2021/0342758 A1   Nov. 4, 2021

(51) Int. Cl.
*G06Q 10/0635* (2023.01)
*G06F 16/332* (2019.01)
(Continued)

(52) U.S. Cl.
CPC ..... *G06Q 10/0635* (2013.01); *G06F 16/3329* (2019.01); *G06F 16/335* (2019.01); *G06Q 10/0637* (2013.01); *G06Q 30/01* (2013.01)

(58) Field of Classification Search
CPC .......... G06Q 10/0635; G06Q 10/0637; G06Q 30/01; G06F 16/3329; G06F 16/335
(Continued)

(56) References Cited

U.S. PATENT DOCUMENTS 10,685,310 B1 *   6/2020   McCuiston ............ G06N 20/00
10,726,374 B1 *   7/2020   Engineer ............ G06Q 10/0635
(Continued)

FOREIGN PATENT DOCUMENTS

WO   2016123528 A1   8/2016
WO   2016138067 A1   9/2016
(Continued)

OTHER PUBLICATIONS

"Enterprise information fusion for real-time business intelligence" G Shroff, P Agarwal, L Dey—14th International Conference on . . . , 2011—ieeexplore.ieee.org (Year: 2011).*
(Continued)

*Primary Examiner* — Charles Guiliano
(74) *Attorney, Agent, or Firm* — Carr & Ferrell LLP

(57) ABSTRACT

Various embodiments relate to data science and data analysis, computer software and systems, and computing architectures and data models configured to facilitate management of enterprise functions, and, more specifically, to an enterprise computing and data processing platform configured to activate risk management transformations of enterprise data in-situ, responsive to identifying a risk event, and further configured to implement a risk management data channel to facilitate analyses and responses associated with an enterprise computing device. In some examples, a method may include receiving a risk data signal, identifying a portion of the risk data signal, computing data representing a risk level, classifying data associated with a hierarchical business data object in accordance with a risk level, aggregating classified data with other data associated with other business data objects classified as a function of risk to form aggregated data, causing presentation of aggregated data as a function of risk.

21 Claims, 16 Drawing Sheets

(51) Int. Cl.
*G06F 16/335* (2019.01)
*G06Q 10/0637* (2023.01)
*G06Q 30/01* (2023.01)

(58) Field of Classification Search
USPC .......................................................... 705/7.28
See application file for complete search history.

(56) References Cited

U.S. PATENT DOCUMENTS

| | | | | |
|---|---|---|---|---|
| 2007/0016542 | A1* | 1/2007 | Rosauer | G06N 5/022 706/21 |
| 2012/0259752 | A1* | 10/2012 | Agee | G06Q 40/00 705/35 |
| 2016/0371618 | A1* | 12/2016 | Leidner | G06F 16/2246 |
| 2018/0040064 | A1* | 2/2018 | Grigg | G06N 5/022 |
| 2019/0173893 | A1 | 6/2019 | Muddu et al. | |
| 2020/0013124 | A1* | 1/2020 | Obee | G06N 20/00 |
| 2020/0057851 | A1* | 2/2020 | Agarwal | G06F 30/20 |
| 2020/0302351 | A1* | 9/2020 | Clark | G06F 9/453 |
| 2021/0084057 | A1* | 3/2021 | Chhabra | H04L 63/1416 |

FOREIGN PATENT DOCUMENTS

| | | |
|---|---|---|
| WO | 2016170551 A9 | 4/2018 |
| WO | 2021225907 A1 | 11/2021 |

OTHER PUBLICATIONS

Improving supply chain security using big data D Zage, K Glass, R Colbaugh—2013 IEEE International . . . , 2013—ieeexplore.ieee.org (Year: 2013).*

A decision support approach for accounts receivable risk management DD Wu, DL Olson, C Luo—IEEE Transactions on Systems, Man . . . , 2014—ieeexplore.ieee.org (Year: 2014).*

Thomas, Shane, Notification of Transmittal of the International Search Report and the Written Opinion of the International Searching Authority, or the Declaration, dated Oct. 1, 2021 for International Application No. PCT/US2021/030303.

* cited by examiner

ACCOUNT LEVEL AARR AT RISK
Recurring Revenue as a function of Accounts at Risk.

Total AARR (%): 86.2% — (L2), (L3), (L4), (L5)
Risk Category: 3M (L2), 5.7M (L3), 10M (L4)
Risk Source: 2.7M, 1.7M, 10M, 3M

*1002*

| Account Name 1021 | Risk (Account Lvl) 1022 | $ AARR 1023 | Owner/User 1024 | Account Name 1025 | Risk (Account Lvl) 1026 | $ AARR 1027 |
|---|---|---|---|---|---|---|
| 456, Inc. | 5. LOW | $31,767 | A. Jones | Appui Holdings, Inc. | 5. LOW | $192,020 |
| 9Blue, Inc. | 5. LOW | $118,506 | | Ascendynt Group | 5. LOW | $270,527 |
| 99, LLC | 5. LOW | $142,406 | | Attilogic News, Inc. | 5. LOW | ($568) |
| LBC, Ltd. | 4. CAUTION | $37,486 | | BUMM Publishing | 5. LOW | $195,552 |
| Kottlet, SA | 5. LOW | $69,712 | | CRT Insurance, Inc. | 5. LOW | $482,737 |
| Laggie, Inc. | 5. LOW | $71,326 | | Cottle-Locke, Ltd. | 5. LOW | $325,216 |
| MXX, Inc. | 5. LOW | $11,136 | | DXG & Associates | 5. LOW | ($18,339) |

Account AARR (Exposure) $18.7M

FINANCIAL ACCOUNTS RECEIVABLE
Accounts Receivable Debtors Account Only.

Account Due $: 740k (L2), 1.2M (L4)
Amount Balance $: 332k (L2), 1.2M (L3), 1.7M (L4)

*1052*

| Account Name 1071 | Risk (Account Lvl) 1072 | Risk (Source) 1073 | AR BALANCE ($) 1074 | AR DUE ($) 1075 |
|---|---|---|---|---|
| TOTAL | | | $26,755,485 | $13,763,727 |
| 9Blue, Inc. | 5. LOW | None | 0 | 0 |
| 99, LLC | 5. LOW | None | 0 | 0 |
| LBC, Ltd. | 4. CAUTION | Portfolio WAU | $199,717 | $195,552 |
| Kottlet, SA | 5. LOW | None | 0 | 0 |
| Laggie, Inc. | 5. LOW | None | 0 | 0 |
| MXX, Inc. | 5. LOW | None | $192 | $192 |

AR Risk Balance $1.7M   AR Risk Due $1.2M

RISK MANAGEMENT: COVID-19
A dashboard to assist in identifying risk across Customers and Prospects RISK LEVEL AND MAPPINGS 1110 / 1110b
- 1. SEVERE — #COVID19.TERMS 1111
- 2. HIGH — #COVID19.RISK 1112
- 3. ELEVATED — #COVID19.PUSH 1113
- 4. CAUTION — #COVID19.SUSPECT 1114
- 5. LOW — No Events Detected 1115

1110a

Filter (ALL)   Accounts (ALL)   ⌄   ⌄

ACCOUNT LEVEL RISK 1120
4 Accounts 1122
5 Events 1124
RISK LEVEL ⌄
SIGNAL FEED ⌄

EXECUTIVE SUMMARY 1130
ACCOUNTS — Risk Profile    4 (L3) ─ 1131
            2 (L2)  1 (L1)
OPPORTUNITIES — Account Level Risk  $2.3M  35k (L2)  2M (L1) ─ 1132
OPPORTUNITIES — Opportunity Level Risk  $46.0k  20k (L3)  26k (L2) ─ 1133

TABLE VIEW

OPPORTUNITIES RISK
The record level risk level to the left of the tables shows whether an opportunity had had an identifier (e.g., hashtag) and a high state of the tag.

1151a 1151b 1151c
Opportunity Level Events (%)  99.52% (L5)
Opportunity Level Events  1   1 (L2)  (L3)
Opportunities by Quarter  235k  216k  1.7M

1152

| Account Name 1161 | Risk (Account Lvl) 1162 | Sum of Amount($) 1163 |
|---|---|---|
| "Unknown" | 5. LOW | $100,000 |
| ACME | 2. HIGH | $116,000 |
| Airtech Canada | 5. LOW | $74,627 |
| Allied Tech. | 5. LOW | $302,124 |
| Aperature Science | 5. LOW | $17,600 |
| Baxter Corp. | 5. LOW | $325,000 |
| Boremco Engine | 5. LOW | $82,490 |

OPPORTUNITIES — Account Level Risk  $2.3M

| Account Name 1171 | Event Name 1172 | Risk (Event Lvl) 1173 | Sum of Amount($) 1174 |
|---|---|---|---|
| "Unknown" | United Part Proj | 5. LOW | $100,020 |
| ACME | ACME-1200 | 2. HIGH | $26,000 |
| | ACME-200 | 3. ELEVATED | $20,000 |
| | ACME-600 | 5. LOW | $70,000 |
| Airtech Canada | Airtech-Can/121 | 5. LOW | $74,627 |
| Allied Tech. | AT-10000 | 5. LOW | $9,625 |
| | AT-525000 | 5. LOW | $36,000 |

RISK MANAGEMENT: "Risk Event"
A dashboard to assist in identifying risk across Customers and Prospects

RISK LEVEL
Select the Level of Risk you wish to review from the summary table below.

Accounts (ALL) ▽  Filter (ALL) ▽  SUMMARY VIEW 1409 ▽

Accounts 4  Events 5  ALL ▽

_1403_

| Risk (Account Lvl) _1421_ | Sum of Amount _1422_ | Unique of Opportunity ID _1423_ | Unique of Account ID _1424_ |
|---|---|---|---|
| Total | $9,504,792.25 | 62 | 27 |
| 1. SEVERE | $1,984,250 | 5 | 2 |
| 2. HIGH | $351,000 | 4 | 3 |
| 5. LOW | $7,169,542.25 | 53 | 24 |

ACCOUNT SUMMARY _1452_
Use the options on the right to change the information displayed.

| Account Name _1461_ | Risk (Account Lvl) _1462_ | Sum of Amount($) _1463_ | Unique of Opportunity ID _1464_ |
|---|---|---|---|
| Total | | $9,504,792.25 | 62 |
| "Unknown" | 5. LOW | $100,000 | 1 |
| ACME | 2. HIGH | $116,000 | 3 |
| Airtech Canada | 5. LOW | $74,626.27 | 1 |
| Allied Tech. | 5. LOW | $302,124 | 3 |
| Aperature Science | 5. LOW | $17,600 | 1 |
| Baxter Corp. | 5. LOW | $325,000 | 2 |

FIG. 14

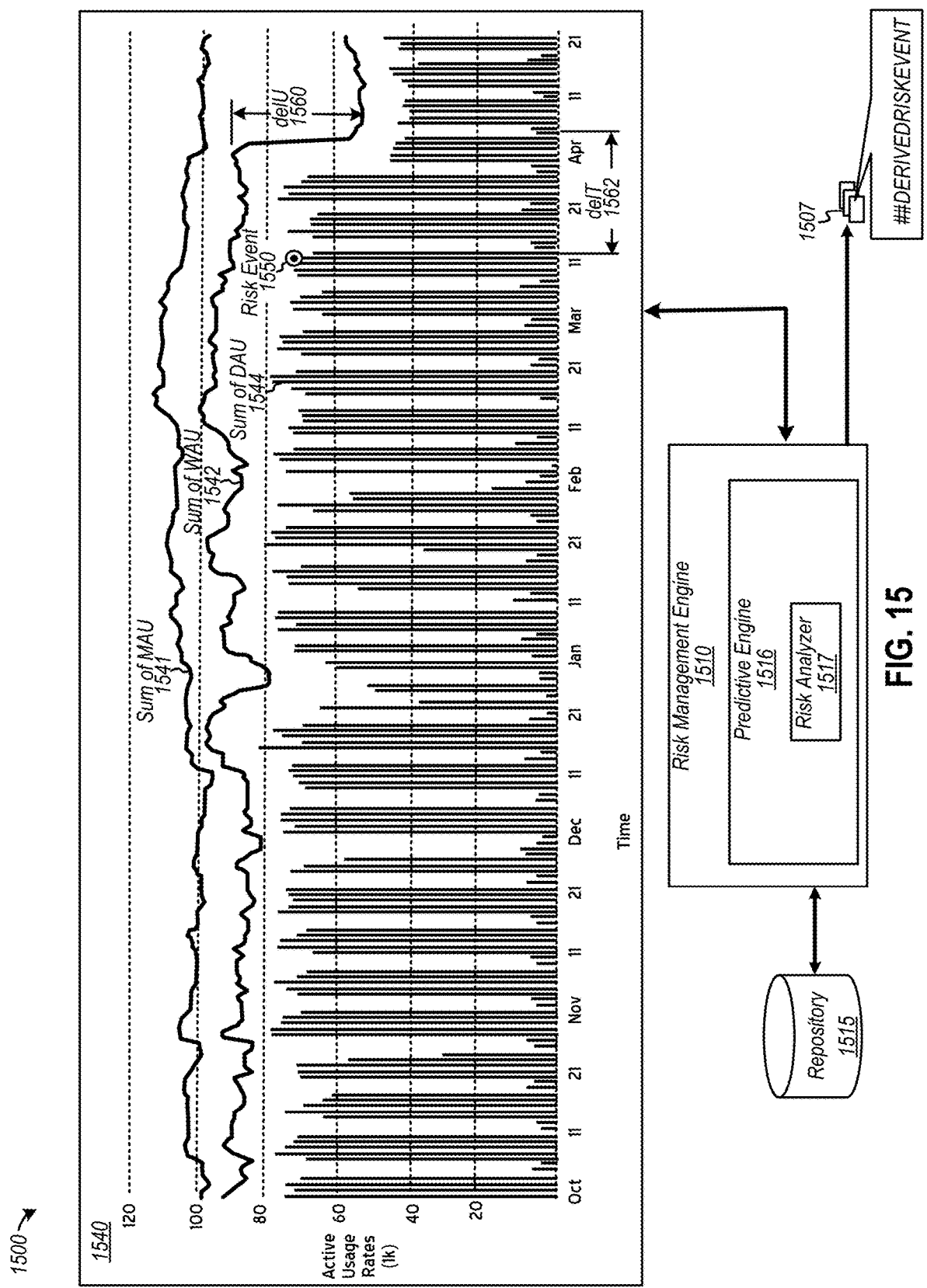

RISK MANAGEMENT DATA CHANNEL INTERLEAVED WITH ENTERPRISE DATA TO FACILITATE ASSESSMENT RESPONSIVE TO A RISK EVENT

FIELD

Various embodiments relate generally to data science and data analysis, computer software and systems, and computing architectures and data models configured to facilitate management and performance of enterprise functions, and, more specifically, to an enterprise computing and data processing platform configured to activate risk management transformations of enterprise data in-situ, responsive to identifying a risk event, and further configured to implement a risk management data channel to facilitate analyses and responses by, for example, an enterprise computing device.

BACKGROUND

Advances in computing hardware and software have fueled exponential growth in analyzing and managing various constituent processes and functions of enterprises, as well as other organizations. For example, computing methodologies and architectures have been developed to implement customer relationship management ("CRM") technologies. Further advancements led to development of software and computing platforms configured to implement enterprise resource planning ("ERP") technologies to further enhance management of business processes. An aim of conventional enterprise-related software and computing process has been to simplify use and provide flexibility of modifying enterprise applications. Yet, developers and other specialized roles are typically required to revise applications to adapt to certain events or business processes, which thereby increases response times to address, for example, a particular risk that an enterprise might otherwise avoid.

The existence of an enterprise depends on a global network of customers, suppliers, and other dispersed activities and business functions, any of which may be impacted by a local or global event. While functional, traditional enterprise applications and computing platforms are not well-suited to respond expeditiously to global or localized (e.g., remote) crises.

Thus, what is needed is one or more solutions to detect, evaluate, and respond to risk events that may affect functions of an enterprise, without the limitations of conventional techniques.

BRIEF DESCRIPTION OF THE DRAWINGS

Various embodiments or examples ("examples") of the invention are disclosed in the following detailed description and the accompanying drawings:

FIG. 10 is a diagram depicting an example of a risk management dashboard configured to present multiple views of enhanced details of risk, according to some examples;

FIG. 11 is a diagram depicting an example of a risk management dashboard implemented in a user interface, according to some examples;

FIG. 14 is a diagram depicting an example of a risk management dashboard configured to present enterprise data in a tabular format as a function of risk, according to some examples;

FIG. 15 is a diagram depicting an example of a risk management engine configured to predictively determine a risk event, according to some examples.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
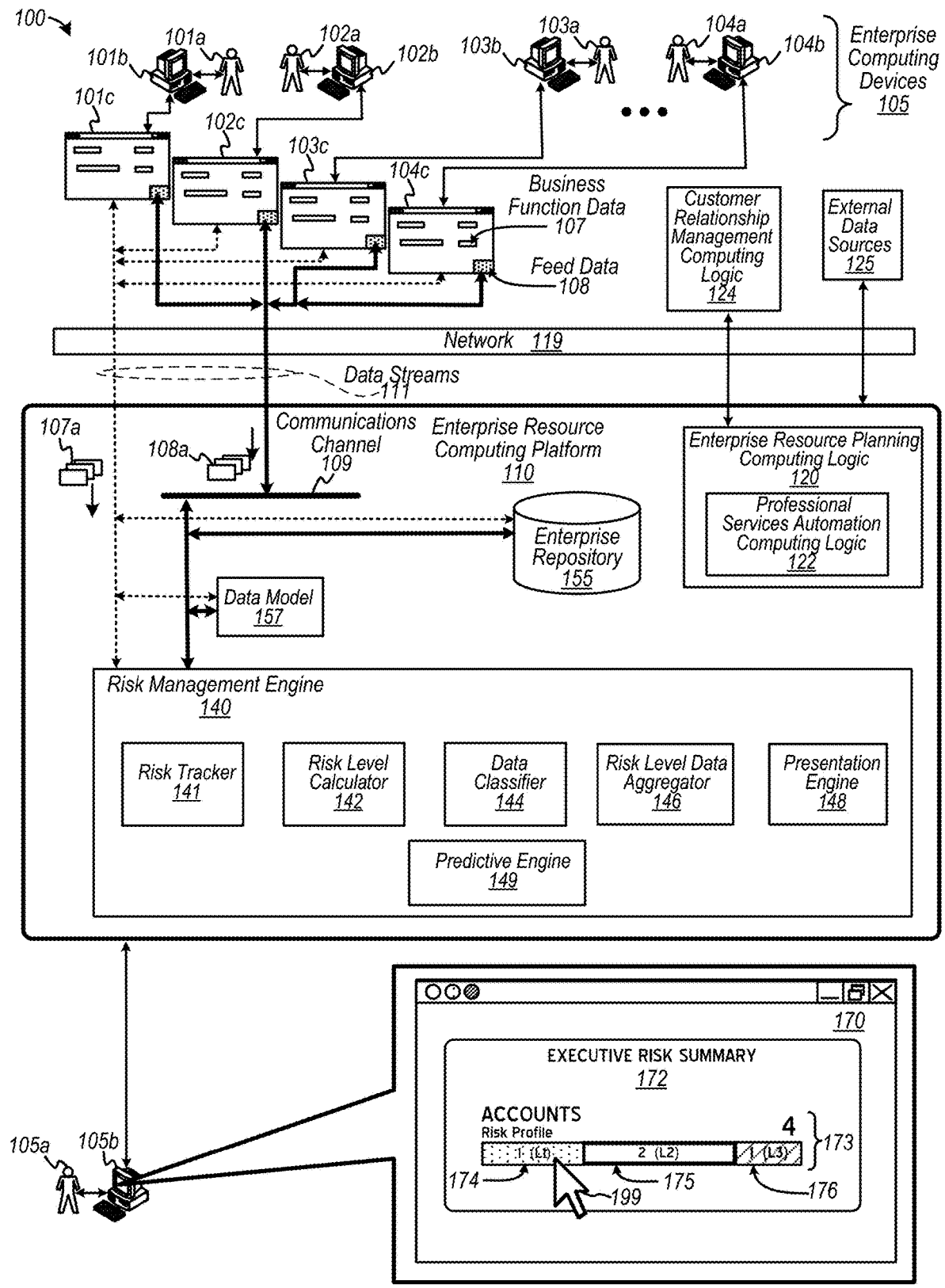
FIG. 1 is a diagram depicting an example of a risk management engine configured to identify a risk event and transform enterprise data for evaluating impact of the risk event on an enterprise and its constituent functions, according to some embodiments.

FIG. 1 is a diagram depicting an example of a risk management engine configured to identify a risk event and transform enterprise data for evaluating impact of the risk event on an enterprise and its constituent functions, according to some embodiments. Diagram 100 depicts an example of a risk management engine 140 configured to monitor enterprise data in data streams 111 to identify a risk event and analyze impact of the risk event on various business functions associated with one or more software application functions and computing systems of an enterprise. As an example, risk management engine 140 may be configured to determine, in response to an identified risk, a degree of risk associated with data representing an account (e.g., a customer or client business) over any number of business functions (e.g., sales, accounting, finance, project management, supply chain management, etc.), as well as determining a degree of risk associated with data representing a business function (e.g., an amount of recurring revenue, delivery times of supplier shipments, etc.) over any number of accounts.

A risk event may be any occurrence that may affect a business plan, decision or process that may impact, for example, a financial position of an enterprise. A risk event may occur internal to an enterprise or external thereto. For example, a risk event may be any natural disaster (e.g., a hurricane, tsunami, earthquake, etc.), a virulent illness (e.g., an epidemic or pandemic, such as the Spanish Flu, Ebola, COVID-19, and the like), war, famine, oil crisis, terrorism, regional economic recessions, political unrest, etc., any of which may affect a business process due to either a remote or global risk event.

In diagram 100, risk management engine 140 may be configured to detect a risk associated with at least one business function, evaluate the degree of risk, transform enterprise data associated with the risk, and present relevant attributes of enterprise data in association with a risk management dashboard. For example, an entity managing four (4) accounts may be impacted by a risk event, whereby each of the four accounts may be impacted differently. Hence, each account may be associated with different levels of risk. In this example, an entity may include a user 105a and a computing device 105b, which may be configured to receive risk-related data to display a risk profile 173 of the four accounts in an executive risk summary 172 (as presented in a user interface 170). As shown, user interface 170 includes a user interface portion 174 (also referred to herein as interactive portion 174) that depicts one ("1") account at a first risk level ("L1"), a user interface portion 175 that depicts two ("2") accounts at a second risk level ("L2"), and a user interface portion 176 that depicts one ("1") account at a third risk level ("L3"), whereby risk level L1 may be most severe and risk level L3 is associated with minimal or negligible risk. User interface portions 174 to 176 may interactive user interface portions, as user inputs, to facilitate transformations of underlying enterprise data that may be affected by a risk event.

In the example shown, risk management engine 140 may be disposed in an enterprise resource computing platform 110, which may include enterprise resource planning ("ERP") computing logic 120 configured to detect, store, manage, and analyze data from any number of business activities or functions of an enterprise. In some examples, enterprise resource planning ("ERP") computing logic 120 may include professional services automation ("PSA") logic 122 that may be configured to facilitate project and resource management, as well as other business processes for professionally-related businesses and services, such as consultants, attorneys, information technologists ("IT" professionals), and the like. Enterprise resource planning ("ERP") computing logic 120 may be configured to electronically communicate with (e.g., integrated with, or "built on") customer relationship management ("CRM") computing logic 124, which may be configured to manage interactions among an enterprise and third party computing devices (e.g., customer devices).

Enterprise resource computing platform 110 may be configured to exchange data with enterprise computing devices 105b, any of which may be configured to perform or facilitate any number of business functions for an enterprise, such as sales, marketing, project planning, finance, accounting, procurement, inventory management, human resource management, supply chain management, and the like. In this example, computing systems 101b, 102b, 103b, and 104b may be associated with users 101a, 102a, 103a, and 104a, respectively. For example, computing device 101b may be configured to perform sales-related functions via a sales-centric user interface 101c, computing device 102b may be configured to perform finance-related functions via a finance-centric user interface 102c, computing device 103b may be configured to perform project management-related functions via a project-centric user interface 103c, and computing device 104b may be configured to perform supply chain management-related functions via a supply-centric user interface 104c.

Business function-centric user interfaces 101c, 102c, 103c, and 104c may be configured to exchange enterprise data via data streams 111 with enterprise resource computing platform 110 over a network 119, such as the Internet or any other network. Enterprise data streams 111 may include business function data 107a and electronic message data 108a. In some examples, business function data 107a may include any business-related data associated with data entry fields or user input portions 107 of user interfaces 101c, 102c, 103c, and 104c. As example, data related to recurring revenue, client credit, account balance due, project delivery dates, opportunity and projected revenue based on pre-sale quotes, and any other business-related information, including notes, comments, and any other unstructured data may be processed in relation to business function data 107 portions of user interfaces 101c, 102c, 103c, and 104c. Enterprise data streams 111 may also include electronic message data 108a originating in data feed portions ("feed data") 108 of user interfaces 101c, 102c, 103c, and 104c, whereby data entered into portions 108 may facilitate formation of a real-time (near real-time) communications channel 109. An example of communications channel 109 includes any in-line electronic messaging application, such as Chatter™ developed by Salesforce.com, Inc. or Slack®, both of San Francisco, CA, USA.

Enterprise resource computing platform 110 may be configured to store business function data 107a and electronic message data 108a in one or more data arrangements in an enterprise repository 155, which may implement any database technology (e.g., as relational databases, graph databases, etc.). Enterprise resource computing platform 110 may be configured to associate business function data 107a and electronic message data 108a with business function data objects and data feed objects of a data model 157. As shown, risk management engine 140 may be configured to receive or exchange business function data 107a and electronic message data 108a (e.g., feed data) directly in real time (or near real time) (e.g., via a pipeline or an event-driven architecture), or any other computing or data architecture). Or, risk management engine 140 may be configured to access business function data 107a and electronic message data 108a as stored in enterprise repository 155.

Risk management engine 140 may include a risk tracker 141, a risk level calculator 142, a data classifier 144, a risk level data aggregator 146, a presentation engine 148, and an optional a predictive engine 149. Risk tracker 141 may be configured to monitor data traffic associated with data streams 111 to detect an instance of a risk data signal. According to some examples, a risk data signal may be implemented as an input originating at user input portions 107 or data feed portions 108. Implementation of a risk data signal at any of user interfaces 101c, 102c, 103c, and 104c may thereby facilitate in-situ instantiation (e.g., localized activation) of a risk management data channel for communications with risk management engine 140, which may facilitate transformations of enterprise data based on, for example, levels of risk. Risk tracker 141 may be also configured to associate a risk data signal (e.g., based on context) with a business function and a business function data object of data model 157. For example, a risk data signal originating at a sales-centric user interface 101c may indicate that a level of risk or a risk event may be associated with sales and sales-related data for one or more accounts (e.g., one or more entities, such as customers or clients).

In some examples, risk tracker 141 may be configured to identify one or more portions of data representing a risk data signal. In various examples, one or more types of information may be encoded into a risk data signal, whereby each portion of a risk data signal may represent a type of information that may optionally be referred to as a dimension of a risk data signal. In some examples, a risk data signal may be implemented as a string of concatenated portions of data. For example, risk tracker 141 may be configured to identify a first portion of a risk data signal to specify a risk event (e.g., a type of risk event), such as COVID19 or QUAKE.

Risk tracker 141 may be configured to identify another portion of a risk data signal to determine a risk level. For example, data association with a second portion of a risk data signal may specify a risk level or may provide data with which to compute or normalize a risk level at risk level calculator 142. In one example, a portion of a risk data signal may include one of the following string portions: "LEVELX" (where "X" represents a risk level), "CAUTION" (associated with a risk level), a "COLOR" representative of a risk level (e.g., "YELLOW" may represent risk level 4), and "TERM," which may represent any term (e.g., "SUSPECT") that may be mapped to a particular risk level.

In some examples, risk management engine 140 may be configured to receive business function data 107a and electronic message data 108a, whereby risk management engine 140 may be further configured to filter through enterprise data (e.g., via data streams 111) to identify and extract a risk data signal. In accordance with at least one example, risk tracker 141 may be configured to identify one or more symbolic characters (e.g., text-based symbols) as a risk data signal, which may be represented as a string of characters (e.g., concatenated characters). For example, a first subset of characters (e.g., a single hash tag, or "#," which may precede a string) may specify a risk data signal, which may be detected via data streams 111 as a risk data signal. Therefore, detection of a specific symbol or character may instantiate implementation of a risk management data channel, which may be interleaved with other enterprise data flowing through data streams 111. Further, implementation and/or detection of a specific symbol may invoke operation of risk management engine 140. In some examples, implementation of another subset of characters (e.g., dual hash tags, or "##") may specify that a risk data signal has been automatically generated by, for example, predictive engine 149 based on any number of datasets being monitored in real-time (or near real-time).

In at least one example, risk management engine 140 may be configured to generate a risk data signal that may be associated with any number of degrees of risk, as well as configurable levels of risk, and any number of business functions, etc. Note, too, that a risk data signal encoded with more than one dimension (e.g., more than one type of data) may be referred to as multi-dimensioned.

Risk level calculator 142 may be configured to calculate or compute a degree of risk (i.e., a risk level) in association with a risk data signal, which, in turn, may be assigned or associated with one or more subsets of enterprise data representing one or more business functions. In at least some examples, risk level calculator 142 may be configured to compute a risk level associated with data corresponding to a business function, such as accounting. As such, a computed risk level may predict a value representing, for example, reoccurring revenue for an account that may be at risk (e.g., an increased probability of loss) in view of occurrence of a risk event. In one example, risk level calculator 142 may be configured to predict a risk level that may be assigned to a subset of enterprise data. In some examples, risk level calculator 142 may determine a risk level based on an algorithmic implementation of a set of static and/or dynamic rules with which to assign a value of a risk level based on a set of rules. In some cases, risk level calculator 142 may determine a risk level based on one or more algorithms configured to implement machine learning and/or deep learning techniques. For example, a computed risk level may be determined based on functionality of risk level calculator 142 implementing support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms. In one example, risk level calculator 142 may be configured to determine a risk level based on analyzing a portion of a risk data signal. For example, a portion of the risk data signal may specify a corresponding risk level (e.g., "LEVEL2"). Therefore, a derived risk level based on a risk data signal may be assigned to corresponding enterprise data.

According to some examples, risk level calculator 142 may be configured to normalize or reconcile multiple levels of risk assigned to multiple business functions over the same or different accounts. For example, consider that a first risk data signal is injected into data streams 111 from sales-centric user interface 101c for account "A," whereby the first risk data signal confers a risk level of "5," which represents a normal state (i.e., no threats). By contrast, a second risk data signal may be injected into data streams 111 from supply-centric user interface 104c for the same account "A," whereby the second risk data signal indicates supply-related data is at a risk level of "2" (e.g., a relatively 'high' risk status) due to a local outbreak of disease, such as COVID-19. In some examples, risk level calculator 142 may be configured to compute different risk levels for different data types for a particular account. However, risk level calculator 142 may be configured to reconcile different risk levels associated with a common account (or over any number of accounts or subsets of enterprise data) to determine a normalized risk level value. A normalized risk level value may be viewed, at least in some examples, as a computed value of risk (e.g., an average risk level value, or any other value) derived from multiple levels of risk for the same or different types of business data. In at least some examples, a level of risk (i.e., a risk level) may be mapped to a subset of associated enterprise or business data based on a portion of a risk data signal that may specify a corresponding risk level.

Data classifier 144 may be configured to classify one or more subsets of data (e.g., enterprise data) as being associated with a risk level determined by risk level calculator 142. In some examples, data classifier 144 may be configured to assign or otherwise associate a risk level identifier to a subset of enterprise data for assessment or analysis at a risk level determined at risk level calculator 142. In some examples, a risk data signal from a sales-related user interface may be assigned and limited to sales-related information associated with an account. In other examples, a level of risk associated with the risk data signal originating at a sales-related user interface may be mapped to the account and its constituent business functions. In some examples, a risk data signal that may be associated with a specific range of risk levels (e.g., risk levels 3 to 1, which may be the most critical) can be classified as a "red flag" event, the classification of which may be transmitted via communications channel 109 (e.g., via Chatter) to alert enterprise users of an impending risk event.

Risk level data aggregator 146 may be configured to aggregate or combine values of enterprise data over any number of accounts. In some cases, data associated with a particular business function (or attributes thereof), such as reoccurring revenue, may be aggregated based on having a common risk level attributed thereto. In some examples, risk level data aggregator 146 may be configured to aggregate business function data associated with an account business object (e.g., a hierarchical business data object) with other data associated with other hierarchical (e.g., account) business data objects classified as being at a risk level to form aggregated data. For example, consider an example in which a number of accounts, including projected revenue values, may be affected due to a risk event. In at least one example, financial data for any number of accounts associated with a particular risk level may be aggregated, to assess which portions of, for example, reoccurring revenue that may be at risk and to what degree. Further, different amounts of reoccurring revenue at risk may (for multiple accounts) be classified and aggregated at different levels (e.g., some accounts may have reoccurring revenue associated with relatively high risk level, whereas other accounts may have reoccurring revenue associated with relatively low risk levels). With this information, an enterprise may be able to expeditiously respond and address an impact to preserve its financial status and customer base due to a risk event. According to various examples, business data may be aggregated any number of ways as a function of risk level, business function, account, and any other enterprise-related attribute.

Presentation engine 148 may be configured to format or otherwise transform data representing one or more subsets of business data (e.g., aggregated business data) associated with one or more risk levels for presentation at, for example, user interface 170, among others. In some examples, presentation engine 148 may include logic to identify business function data with respect to a risk level and to present the business function data based on, for example, of one or more corresponding risk levels. According to some examples, presentation engine 148 may be configured to execute instructions to activate a risk management dashboard application. In at least one example, presentation engine 148 may be configured to implement a presentation format for causing display of a certain type of risk-related data at user interface 170 in a certain display format conducive for managing risk.

In some examples, presentation engine 148 may be configured to cause presentation of a subset of aggregated data at a risk level relative to one or more other risk levels. For example, a first set of accounts may have an account balance due that may be assessed at a risk level "2," whereas another set of accounts having account balances due may be assigned a risk level "4." Therefore, presentation engine 148 may be configured to cause presentation of business data at a first risk level and presentation of business data at one or more other risk levels. For example, risk profile 173 of user interface 170 depicts multiple accounts associated with multiple levels of risk (e.g., risk levels L1, L2, and L3).

In accordance with some examples, presentation engine 148 may be configured to present a subset of aggregated data at a risk level (e.g., L1) relative to an interactive portion 174 of user interface 170. Therefore, user interface portion 174 may be configured to receive user input, such as an input derived from an interaction by a graphical selector element 199 with interactive portion 174 of user interface 170. Thus, presentation engine 148 may be configured to receive data representing a user input responsive to activation of interactive portion 174 of user interface 170. In response, risk management engine 140 may be configured to cause presentation of another subset of the aggregated data upon selection of interactive portion 174.

Predictive engine 149 may include logic configured to predict whether an event may be classified as a risk event that may affect functions of an entity, such as an enterprise. Further, predictive engine 149 may be configured to access data from external data sources 125, as well as internal data sources (e.g., within an enterprise), to determine whether a risk event exists, and whether to communicate that via data streams 111. In some examples, predictive engine 149 may be configured monitor external data sources 125 to detect possible risk events. For example, predictive engine 149 may receive data from external data sources 125 that suggests an earthquake may affect a certain region in which one or more suppliers may be impacted (e.g., shut down). In response, predictive engine 149 may be configured to automatically inject into data streams 111 a risk data signal specifying a risk event indicating an earthquake in association with at least a subset of business functions that may be impacted by the earthquake. Therefore, predictive engine 149 may be configured to identify risk events and generate risk data signals so as to invoke responses within an enterprise. In some cases, predictive engine 149 may be configured to implement any of support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms. In one example, predictive engine 149 may be configured to determine a risk level based on analyzing data patterns that may be matched against machine-predicted patterns or against a set of one or more rules.

Any of described elements or components set forth in FIG. 1 and any other figure herein may be implemented as software, hardware, firmware, circuitry, or any combination thereof.

In view of the foregoing, structures and/or functionalities depicted in FIG. 1 as well as other figures herein, illustrate one or more applications, algorithms, systems and platforms to detect, evaluate, analyze, identify, track, communicate, and/or resolve one or more issues of one or more enterprise functions in response to a risk event, according to some embodiments. In accordance with some examples, risk management engine 140 may be configured to facilitate implementation of a risk management data channel, which may be interleaved with (or overlaid upon) other enterprise data flowing through data streams 111. In some examples, implementation of a risk management data channel need not affect other enterprise data streams. Further, a risk management data channel may be formed without requiring intervention by developers (e.g., IT personnel) or any other specialized knowledge that otherwise may be necessary to revise code or processes of enterprise resource computing platform 110. Therefore, one or more business functions of an enterprise may be able to detect a risk event relatively expeditiously, which, in turn, may decrease a response time in which to ameliorate impact the risk event upon an enterprise.

In some examples, a risk management data channel may be instantiated in-situ (e.g., localized activation), such as at user interface 101c to 104c configured to perform an enterprise function or operation. Therefore, a risk management data channel may be formed as an ephemeral or ad-hoc communications channel. Or, it may be configured to be dormant until another similar risk event arises, as processed by risk management engine 140. In some examples, activation of a risk management data channel may be responsive to detecting a specific symbol (e.g., #) in enterprise data streams 111. In other examples, a risk data signal may be implemented as unstructured data that be dispose in any data entry field of user interface 101c to 104c (e.g., a notes section or a data feed in which a risk data signal may be established).

According to various examples, risk management engine 140 may be configured to implement predictive engine to predict whether an external event (e.g., a hurricane) may affect customers who may have supply chains that extend into areas affected by the hurricane. Further, various computational processes described herein aggregate enterprise data as a function of risk level, account, business function, and the like, so that an enterprise may resolve or minimize issues (e.g., automatically) associated with a risk event.

In accordance with various other embodiments, structures and/or functionalities of risk management engine 140 may be configured to perform any function to facilitate any objective of an enterprise, whereby logic of risk management engine 140 may be configured to address any event or condition (e.g., other than addressing risk). Therefore, structures and/or functionalities of risk management engine 140 need not be limited to assessing and managing events associated with risk. Structures and/or functionalities of risk management engine 140 may be adapted to facilitate implementation of any function of an enterprise (or any other entity). For example, logic (e.g., whether hardware, software, or a combination thereof) associated with risk management engine 140 may be configured to facilitate formation of any interleaved data channel to communicate and manage any type of data in data streams 111 of enterprise data.

In various implementations, risk management engine 140 may be referred to, or otherwise operate as, a "metric management engine" that may be configured to manage any metric or goal (or underlying processes) of an enterprise. For example, a metric management engine 140 may be configured to manage opportunities (e.g., rewards) to incentivize or "nudge" one or more teams or business functions to align with a particular corporate objective or mission. In other examples, any number of metric management engines 140 may be replicated and implemented (e.g., concurrently) in an enterprise.

Figure 2:
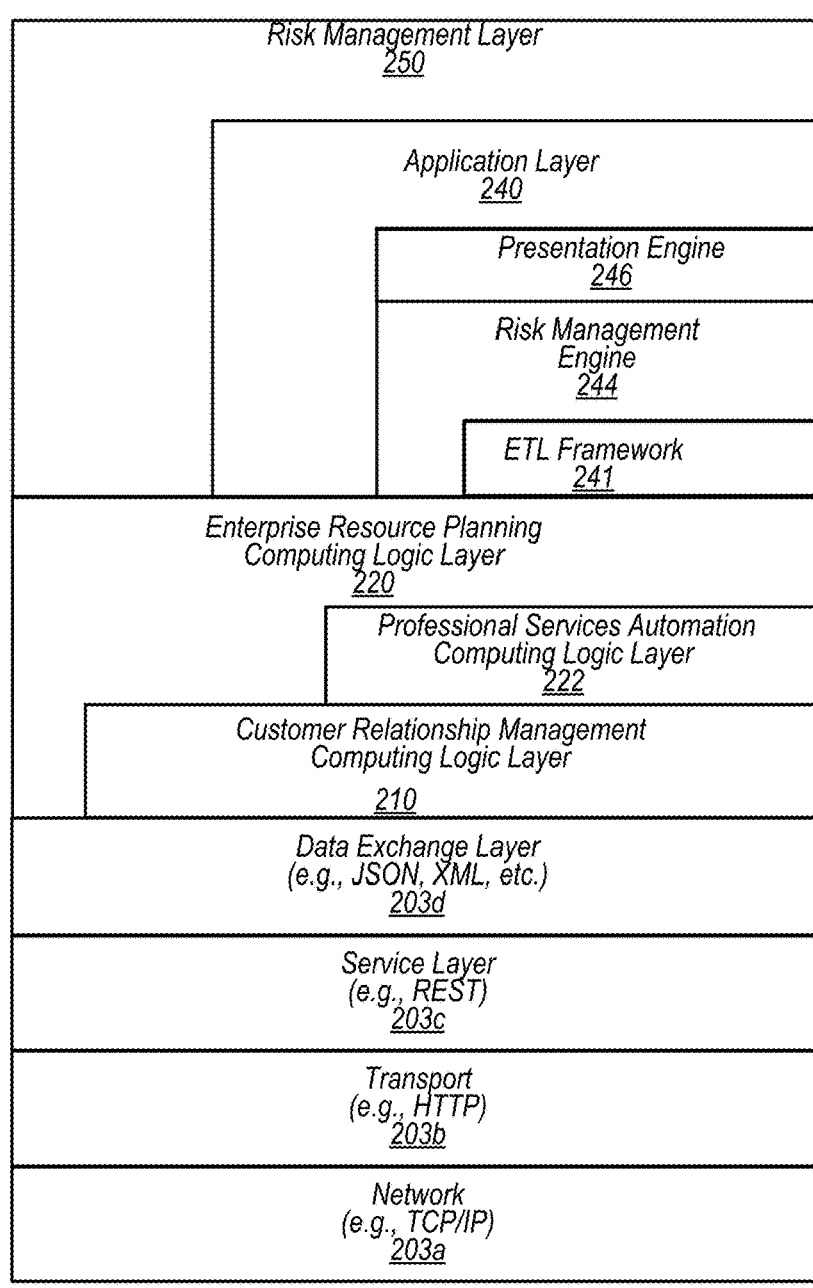
FIG. 2 illustrates an exemplary layered architecture for implementing a risk management engine application, according to some examples.

FIG. 2 illustrates an exemplary layered architecture for implementing a risk management engine application, according to some examples. Diagram 200 depicts application stack ("stack") 201, which is neither a comprehensive nor a fully inclusive layered architecture for activating risk management transformations of enterprise data in-situ, responsive to identifying a risk event, or for implementing a risk management data channel. One or more elements depicted in diagram 200 of FIG. 2 may include structures and/or functions as similarly-named or similarly-numbered elements depicted in other drawings, or as otherwise described herein, in accordance with one or more examples, such as described relative to FIG. 1 or any other figure or description herein.

Application stack 201 may include a risk management layer 250 upon an enterprise resource planning computing logic layer 220, which, in turn, may be disposed upon any number of lower layers (e.g., layers 203a to 203d). Enterprise resource planning computing logic layer 220 may be disposed on data exchange layer 203d, which may implemented using any programming language, such as HTML, JSON, XML, etc., or any other format to effect generation and communication of requests and responses among computing devices and computational resources constituting an enterprise and an enterprise resource planning application and/or platform. Data exchange layer 203d may be disposed on a service layer 203c, which may provide a transfer protocol or architecture for exchanging data among networked applications. For example, service layer 203c may provide for a RESTful-compliant architecture and attendant web services to facilitate GET, PUT, POST, DELETE, and other methods or operations. In other examples, service layer 203c may provide, as an example, SOAP web services based on remote procedure calls ("RPCs"), or any other like services or protocols. Service layer 203c may be disposed on a transport layer 203b, which may include protocols to provide host-to-host communications for applications via an HTTP or HTTPS protocol, in at least this example. Transport layer 203b may be disposed on a network layer 203a, which, in at least this example, may include TCP/IP protocols and the like. Note that in accordance with some examples, layers 203a to 203d facilitate implementation of a risk management data channel as set forth herein.

Enterprise resource planning computing logic layer 220 may be configured to detect, store, manage, and analyze data from any number of business activities or functions of an enterprise. As shown, enterprise resource planning computing logic layer 220 may include a professional services automation computing logic layer 222 that may be configured to facilitate project and resource management, and to provide other business-related functionality. Enterprise resource planning computing logic layer 220 may also be configured to provide functionality to manage various business functions, such as sales, pre-sale opportunity development, accounting, billing, revenue recognition, procurement, inventory management, project management, human capital management ("HCM"), supply chain management ("SCM"), among various other business functions. In at least one example, enterprise resource planning computing logic layer 220 and professional services automation computing logic layer 222 may be implemented as logic, platforms, and/or applications maintained by FinancialForce.com, Inc., of San Francisco, CA, USA. In some examples, enterprise resource planning computing logic layer 220 and professional services automation computing logic layer 222 may be layered upon a customer relationship management computing logic layer 210, which may be configured to manage interactions among an enterprise and third party entities and computing devices. An example of functionality provided at customer relationship management computing logic layer 210 may include CRM-related logic, platforms, and/or applications maintained by Salesforce.com, Inc., of San Francisco, CA, USA. In accordance with some examples, layers 220, 222, and 210 may include communication layers (e.g., application programming interface, or "API," layers). Examples of APIs or other communicative applications may include any code-based data connector that may facilitate communication throughout application stack 201 and external thereto. Layers 220, 222, and 210 may also include business components and a process and/or application builder, both of may be implemented as Lightning components and Lightning App Builder (e.g., as maintained by Salesforce.com, Inc.), or as any other component or application builder.

As shown, risk management layer 250 may be disposed on or otherwise built on layers 220, 222, and 210, and provides risk management functionality as described herein. Further to diagram 200, risk management layer 250 may include (or may be layered upon) an application layer 240 that includes logic constituting a presentation engine layer 246, a risk management engine layer 244, and an extraction-transformation-load ("ETL") framework layer 241. Risk management engine layer 244 may be configured to provide functionality as described herein. ETL framework layer 241 may be configured to facilitate extraction of business-related data as a function of risk level, and transform the extracted data into a format suitable for presentation in a risk management dashboard application and user interface.

Any of the described layers of FIG. 2 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by FinancialForce.com, Inc. or Salesforce.com, Inc. The above described techniques may be varied and are not limited to the embodiments, examples or descriptions provided.

Figure 3:
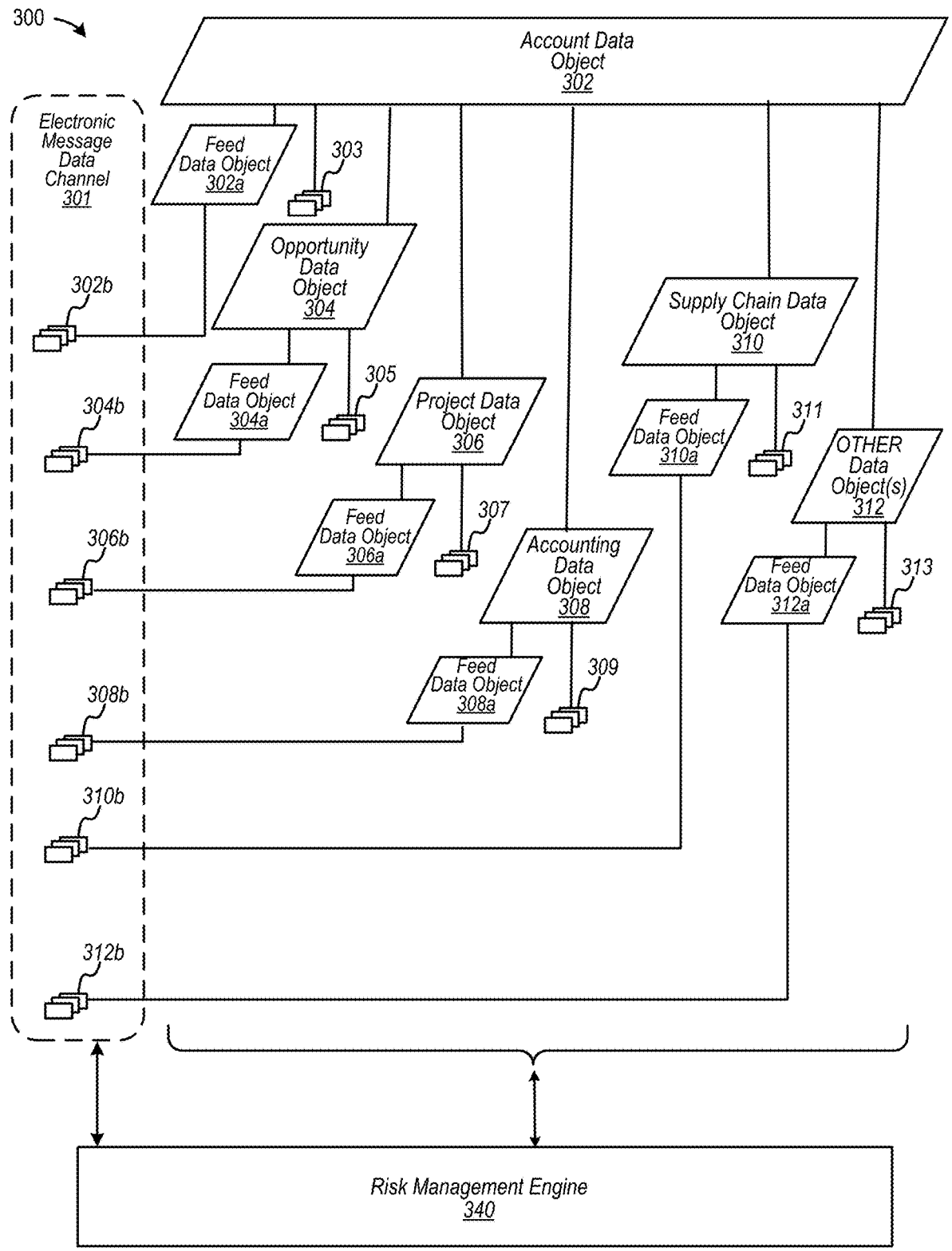
FIG. 3 is a diagram depicting an example of a data model with which a risk management engine may identify and analyze business functions based on levels of risk, according to some embodiments.

FIG. 3 is a diagram depicting an example of a data model with which a risk management engine may identify and analyze business functions based on levels of risk, according to some embodiments. Diagram 300 depicts a data model at which an account data object 302 may be configured to be a hierarchical data object (e.g., a parent data object), under which other business function-related data object may be related. For example, account data object 302 may include or refer to an opportunity data object 304, a project data object 306, an accounting data object 308, a supply chain data object 310, and "other" one or more data objects 312 that may related to any other type of business data and business data objects. In some examples, data model of diagram 300 may be disposed in data model 157 of FIG. 1.

Each of data objects 302 to 312 may include (or link to) a subsidiary feed data object (or "data feed object"), such as data objects 302a to 312a, whereby each feed data object may be associated with data originating or associated with a feed communication channel or application (e.g., a Chatter channel). Thus, account feed data 302b, opportunity feed data 304b, project feed data 306b, accounting feed data 308b, supply chain feed data 310b, and other feed data 312b may constitute an electronic message data channel 301. In some examples, any of feed data 302b to 312b may include a risk data signal, which, in turn, may interleave a risk communication data channel into (and with) data streaming in electronic message data channel 301.

Each of data objects 302 to 312 may also include (or link to) business function data (or business function data objects) 303 to 313, respectively. For example, account business function data 303 may include data representing an account owner, an account name, annual revenue associated with the account, a general account balance including accounts receivable aging, and the like, as well as a "notes" section or data entry field. Opportunity business function data 305 may include data representing a potential lead or customer name, a quoted monetary amount, an associated currency (e.g., a British Pound), a payment plan or timeline of payments, a name of a project or product for which a quote may be sought, and any other information associated with pre-sales activity including a "notes" section or data entry field. Project business function data 307 may include data representing a resource planner, names of persons who are associated with a project, project costs, timelines and projected milestones (e.g., via a Gantt chart), among other project-related data, including a "notes" section or data entry field. Accounting business function data 309 may include data representing any of a total revenue for one or more accounts, recognized revenue, average annual recurring revenue or AARR based on subscriptions, accounts receivable amounts, and other financial-related data, as well as any notes regarding accounting for any customer. Any other business function data, such as data 311 and 313 may include data related to a corresponding business function.

According to various examples, any of business function data 303 to 313 may be interspersed into a data stream (e.g., data stream 111 of FIG. 1). In some instances, any of business function data 303 to 313 may be configured to implement, accept, or inject a risk data signal into a data stream. For example, a notes section of a project-related user interface may include data explaining: "This project is on hold through the end of the month as they attempt to navigate through COVID-19. There is a longer story with this project as well. Many delays due to client unavailability, but they assure me they want to move forward after this pandemic eases up on us all. Down with COVID19! Best of luck to us all!"

Risk management engine 340 may be configured to receive data from electronic message data channel 301 and data associated with any of business function data 303 to 313. Risk management engine 340 may be further configured to identify a risk event and/or a risk data signal in any data stream. In the latter example, risk management engine 340 may be configured to detect "COVID19" as a risk event and may associate the corresponding account with a level of risk. In some examples, a predictive engine may perform natural language processing ("NLP") to extract key words, such as "on hold," "end of the month," "longer," "delays," and the like, and assign a level of risk to the account, all of which may correlate (e.g., in combination) to a particular level of risk. Thereafter, an assigned level of risk may propagate through an enterprise and its computing systems to alert or inform different business functions as to the status of associated client or customer.

Figure 4:
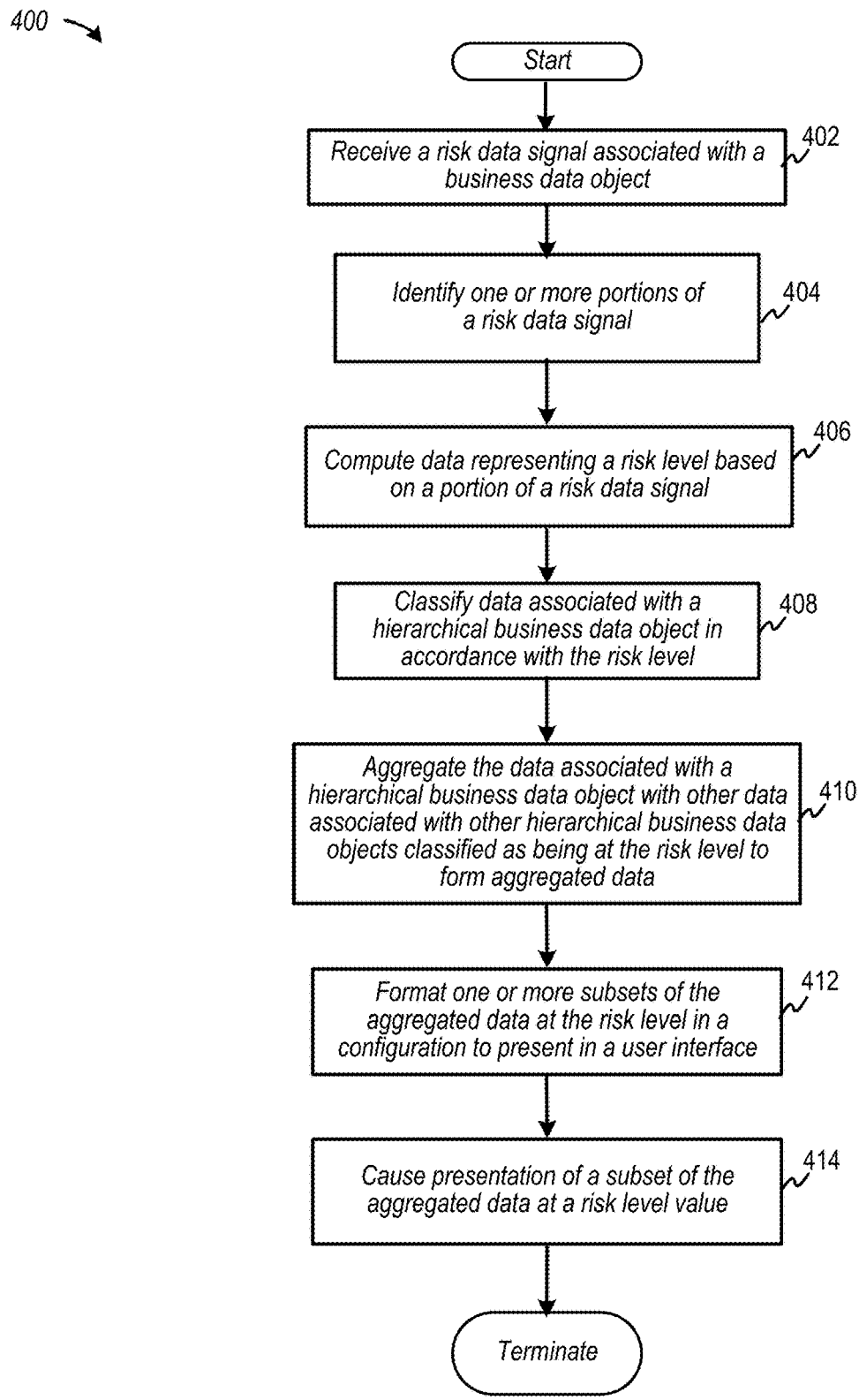
FIG. 4 is a diagram depicting a flow diagram as an example of identifying a risk event associated with an enterprise and its constituent functions, according to some embodiments.

FIG. 4 is a diagram depicting a flow diagram as an example of identifying a risk event associated with an enterprise and its constituent functions, according to some embodiments. Flow 400 begins at 402, at which risk data signal associated with a business data object (e.g., a business function data object) may be received. For example, a risk data signal may originate at a user interface configured for managing human resources, thereby associating a risk data signal with a business data object associated with managing human resources. In at least some cases, a business data object may be a child object of a hierarchical business data object (e.g., a parent business data object). In some examples, a hierarchical business data object may be identified as an "account" business data object, under which any number of functions and related data objects may be associated. An account business data object, as a parent object, may be associated with an identifier (i.e., an account ID) that be used to reference an account and its subsidiary data in a data model. In at least one example, a risk data signal may be detected based on one or more uniquely-defined characters (e.g., such as one or more tags "#").

At 404, one or more portions of a risk data signal may be identified to determine its constituent components and corresponding functionality. According to some examples, each constituent component may be a dimension that may identify a type of risk event, a corresponding level of risk, a specific business function affected by a risk event, and any other information. In some examples, a constituent component may include data configured to present a risk level value, or may include data used to normalize or predict a risk level. At 406, data representing a risk level based on a portion of the risk data signal may be computed. For example, a risk level between one ("1") and five ("5") may be computed, similar to a scale corresponding to the "DEFCON" alert system associated with increasing degrees of threat or risk (e.g., level 1 represents a SEVERE risk status and level 5 represents a NORMAL or negligible risk status). At 406, data representing a risk level based on a portion of the risk data signal may be computed. For example, a portion of a risk data signal may specify a particular risk level for classifying a subset of data. In some examples, a portion of a risk data signal may map associated business function data (e.g., sales-related data) to a risk level value.

At 408, data associated with a hierarchical business data object (e.g., an account business object) may be classified in accordance with a computed risk level. At 410, data associated with a hierarchical data object (e.g., an account data object) may be aggregated with other subsets of data of similar risk levels. For example, data being associated with any subordinate or child data objects associated with a particular risk level may be correspondingly assigned or associated with a corresponding risk level. As another example, similar data (e.g., similar business function data, such as revenue data over any number of accounts) among various accounts may be aggregated as a function of a risk level.

At 412, one or more subsets of aggregated data associated with a particular risk level may be configured and formatted for presentation in a user interface. In some cases, logic in a presentation layer may be configured to access a data model with which subsequent queries may be performed. At 414, presentation of a subset of aggregated data associated with a particular risk level may be presented. For example, aggregated data associated with a subset of customers may be presented in a user interface, such as a risk management dashboard or user interface.

Figure 5:
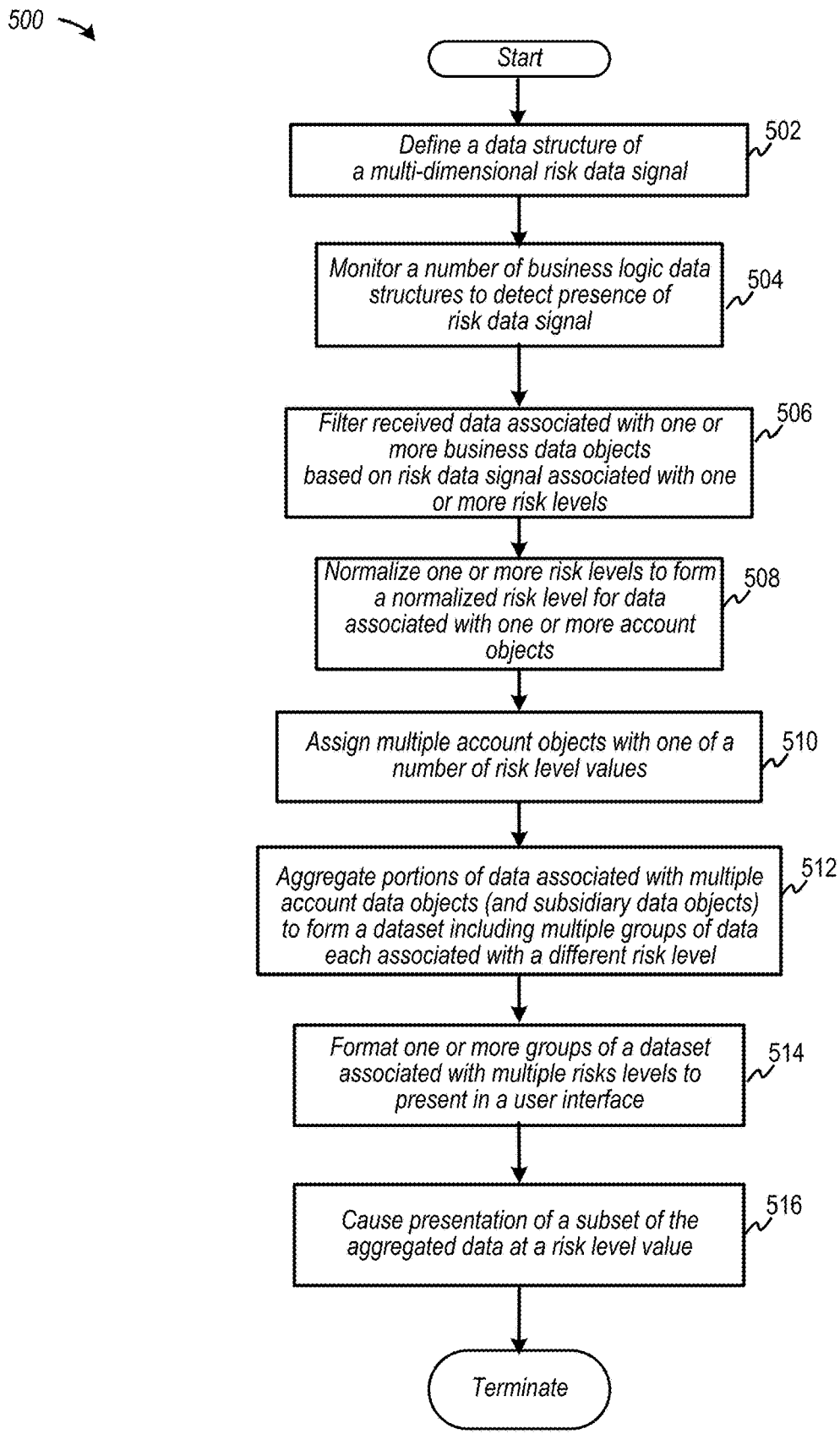
FIG. 5 is a diagram depicting a flow diagram as another example of addressing a risk event associated with an enterprise and its constituent functions, according to some embodiments.

FIG. 5 is a diagram depicting a flow diagram as another example of identifying a risk event associated with an enterprise and its constituent functions, according to some embodiments. Flow 500 begins at 502, at which a data structure for a multi-dimensional risk data signal may be defined. A risk data signal may be generated via an application builder program, an example of which may be implemented as a "Lightning App Builder" provided by Salesforce.com, Inc., of San Francisco, CA An application builder program, when executed, may be configured to present data fields that facilitate entry of data defining a type of risk signal (e.g., a signal specifying a COVID19 risk event) and any number of risk levels associated with a risk data signal, as well as additional dimensional data (e.g., as concatenated data). An example of additional dimensional data may include text defining a risk level (e.g., SEVERE). As such, a risk data signal may be created to have the following form: #COVID19SEVERE, which, when input into an enterprise data stream, may establish or instantiate a risk management data channel for communications with a risk management engine.

At 504, any number of business logic data structures may be monitored to detect the presence of a risk data signal. In some examples, a business logic data structure may be implemented as a business function data object or may be data structured in a transmissible form (e.g., as data is transmitted via enterprise data streams, such as data stream 111 of FIG. 1). At 506, data associated with one or more business data objects may be filtered from data streams exchanged among an enterprise resource computing platform and any number of computing devices implementing business-centric user interfaces (e.g., interfaces configured to facilitate business functions, such as sales, pre-sale opportunities, finance, accounting, resource management, project management, supply chain management, etc.).

At 508, one or more risk levels associated with one or more subsets of enterprise data may be normalized to, for example, establish a normalized risk level for data associated with one or more account data objects. For example, consider a data model in which an account object is a parent of children objects, such as a sales business function object and a project management business function object. In an event that a sales business function object and a project management business function object may be associated with enterprise data classified at different risk levels, the different risk levels may be reconciled to establish, in at least some examples, a particular risk level for an account business function object (and its children objects). At 510, multiple account objects may be assigned one or more number of risk level values, whereby account objects may be grouped as a function of risk level. In one example, one or more risk levels may be classified as "red flag" risk levels, the status of which may be elevated or communicated throughout an enterprise (e.g., via data streams, including a Chatter feed).

At 512, subsets or portions of data associated with multiple account data objects, including subsidiary or child data objects, may be aggregated based on one of a number of different risk levels to form a dataset. A risk-based dataset may be used, for example, to implement a risk management dashboard application for facilitating analyses and responses by one or more enterprise computing devices. At 514, one or more groups of data from a dataset may be formatted or otherwise transformed to present enterprise-related data risk management dashboard application as a function of one or more combinations or permutations of account data, business function data, business attribute data, risk level data, and the like. At 516, presentation or display of a subset of aggregated data may be transmitted to (e.g., from an enterprise resource computing platform), or generated at (e.g., at a browser application) to a user interface, thereby presenting a risk management dashboard.

Figure 6:
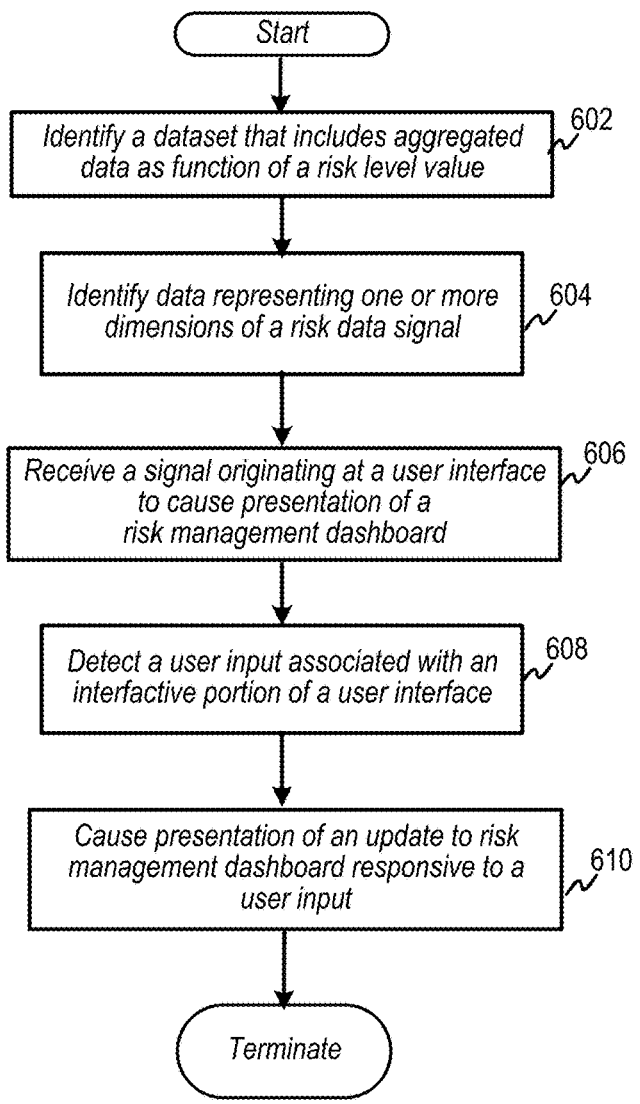
FIG. 6 is a diagram depicting a flow diagram as an example of implementing a risk management dashboard, according to some embodiments.

FIG. 6 is a diagram depicting a flow diagram as an example of implementing a risk management dashboard, according to some embodiments. Flow 600 begins at 602, at which a dataset that includes aggregated data as a function of a risk level value may be identified. In some cases, the dataset may reside in a data arrangement stored in repository, or may be accessed at a time when relevant data may be requested for presentation to a risk management dashboard. At 604, data representing one or more dimensions of a risk data signal may be identified, whereby at least one dimension (or portion thereof) may specify a type of risk or risk event, such as COVID-19.

At 606, a signal originating at a user interface may be received (e.g., into a browser application or into an enterprise resource computing platform). In some examples, a signal (e.g., as a presentation signal) may be configured to cause presentation of a risk management dashboard in the user interface. In one example, a risk management dashboard application may be configured to format or transform enterprise data as a function of risk level and any other attribute, such as a type of business function, whereby the formatted or transformed enterprise data may be configured for display at a user interface.

At 608, a user input may be detected, the user input being associated with an interactive portion of the user interface. For example, a risk management dashboard may present a graphic that displays proportions of various risk levels assigned to a particular metric, such as reoccurring revenue. Each portion of the graphic may be interactive, such that a user may select a portion of the graphic to drill down into further details. Interactive portions of a user interface each may constitute a user input. For instance, selecting a portion of a graphic indicating 70% of total account revenue is associated with a risk level of "CAUTION" may cause a risk management dashboard application to present each individual account (e.g., in a tabular format) for inspection and analysis. At 610, an update to a risk management dashboard may be presented, in response to a user input (e.g., selection of an interactive portion of the user interface).

Figure 7:
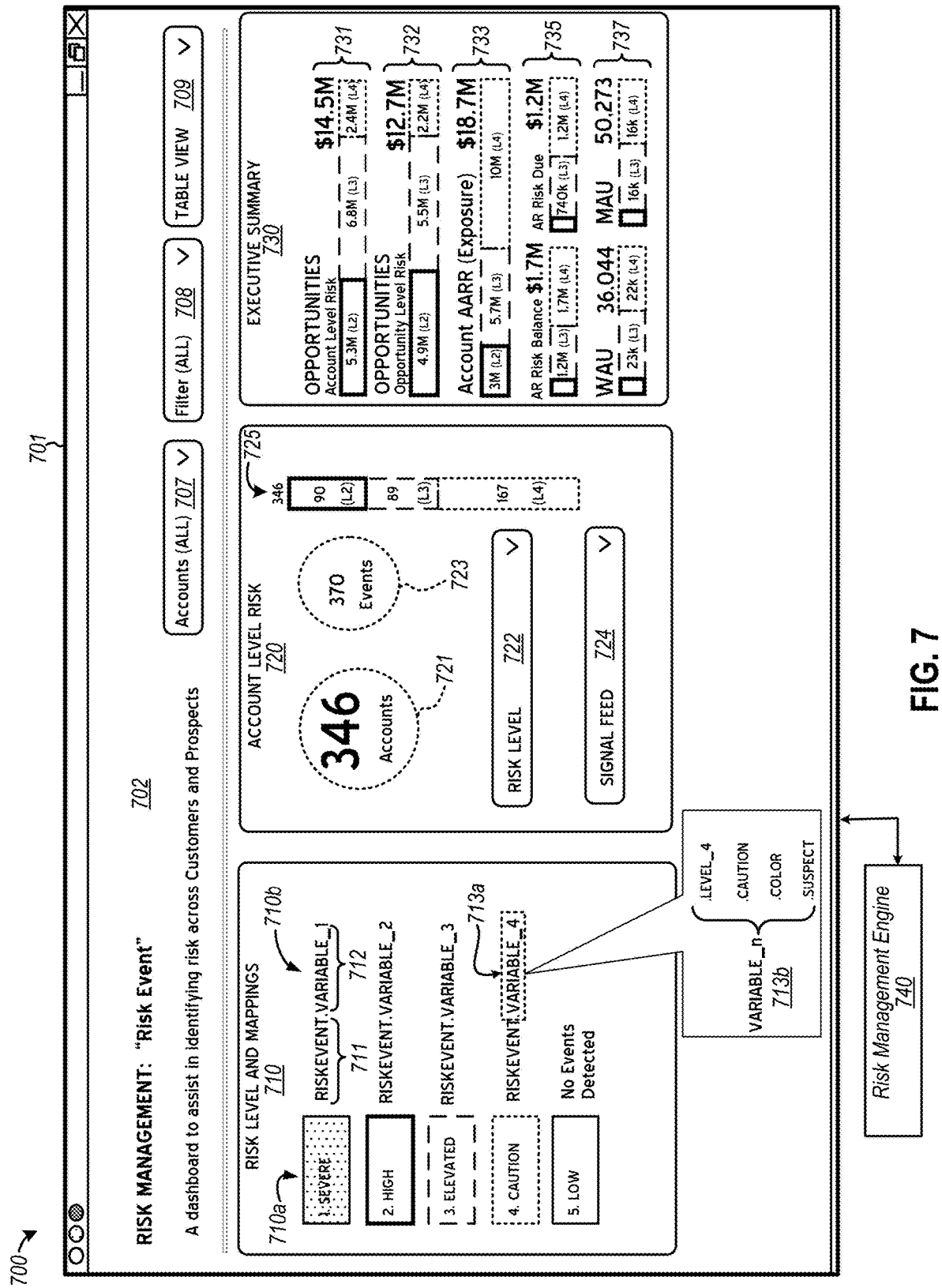
FIG. 7 is a diagram depicting an example of a risk management engine configured to cause generation of a risk management dashboard in a user interface, according to some examples.

FIG. 7 is a diagram depicting an example of a risk management engine configured to cause generation of a risk management dashboard in a user interface, according to some examples. Diagram 700 depicts a risk management engine 740 configured to generate a user interface 701 in accordance with one or more techniques and/or processes described herein. In accordance with functionality described herein, risk management engine 740 may be configured to identify a risk data signal associated with various business function-related data, any of which may be extracted (as a function of risk) and formatted or otherwise transformed for presentation in a risk management dashboard 702.

As shown, risk management engine 740 may be configured to generate formatted data for presenting interactive user interface portions that include a risk level and mappings interface portion 710, an account level risk summary interface portion 720, and an executive summary interface portion 730, which may present financially-related information affected by a risk event. Risk level and mappings interface portion 710 may include elements 710*a* indicating a range of risk levels (e.g., from "low" to "severe"), as well as associated components or dimensions of risk data signals 710*b*. Risk data signal 710*b* may include a dimension 711 that may specify a particular risk event (e.g., COVID19) and a dimension 712, as a variable, that may specify, at least in this example, an associated level of risk. For example, dimension 713*a* may include any information that indicates a particular risk level 713*b*. Examples of information indicating a risk level associated with CAUTION may be expressed as "LEVEL4," "CAUTION," "YELLOW" (as a color), "SUSPECT," or any other identifier. Note that each risk level is shown and distinguished by different line styles (e.g., line dash sizes, shading, thickness, etc.).

Account level risk summary interface portion 720 may be configured to depict and provide additional functionality in association with a number of accounts 721 and a number of events 723, which may include potential sale opportunities that are likely to mature into accounts. Account level risk summary interface portion 720 may include an interactive data portion that presents a risk profile 725 that specifies that out of 346 accounts, 90 accounts are associated with a level 2 (L2, or "high") risk level, 89 accounts are associated with a level 3 (L3, or "elevated") risk level, and 167 account are associated with a level 4 (L4, or "caution") risk level. Further, a user input 722 may be configured to present business-related data as a function of risk level, whereas a user input 724 may be configured to present business-related data as a function of a source of a data feed (e.g., relating to sales, accounting, procurement or the like) and a risk level value.

Figure 9:
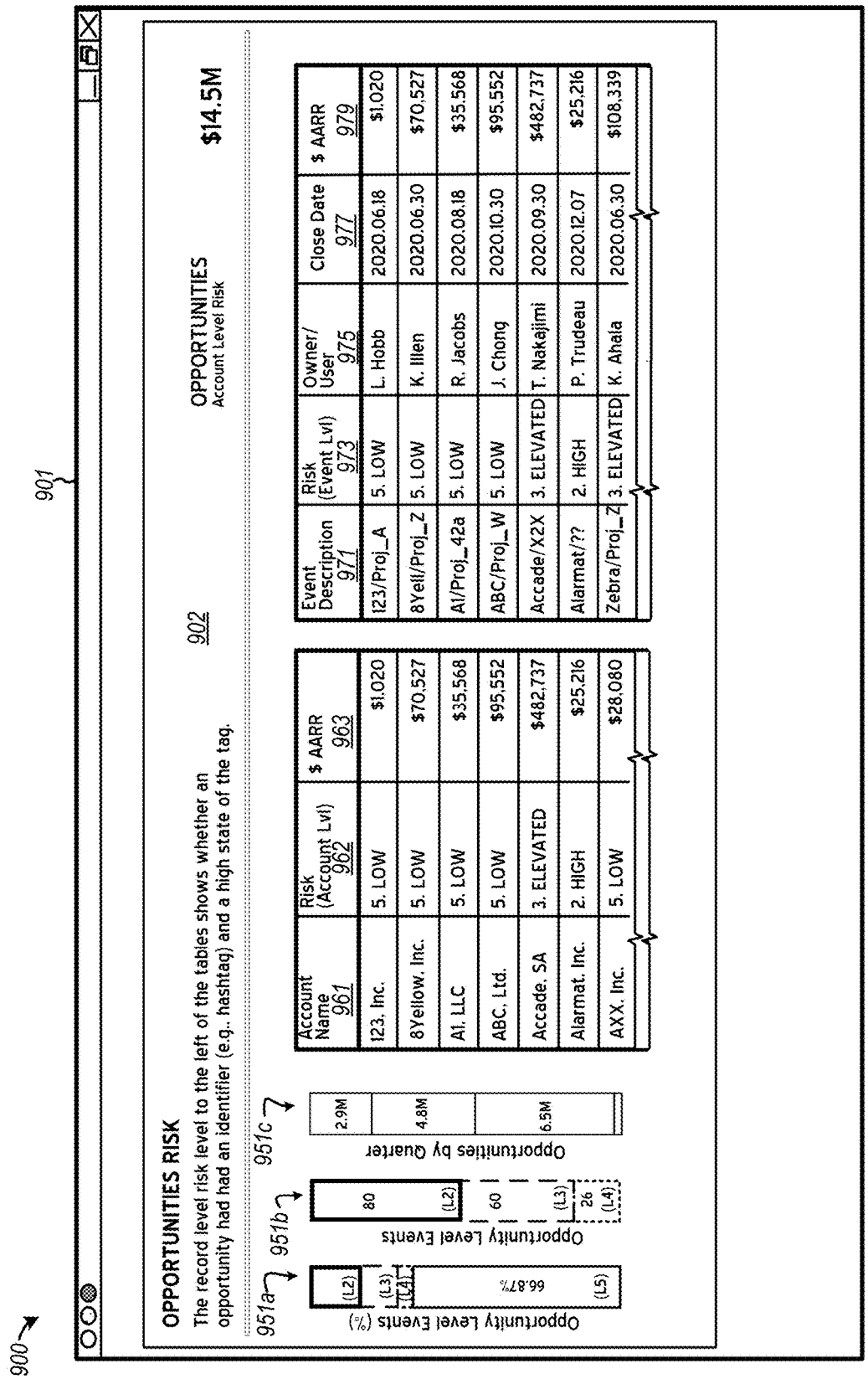
FIG. 9 is a diagram depicting another example of a risk management dashboard configured to present enhanced details of risk, according to some examples.

Executive summary interface portion 730 may be configured to depict a number of interactive elements 731 to 737, each of which may convey information regarding impact of a risk event on various business functions and attributes. In this example, each of interactive elements 731 to 737 may include interactive user interface portions that, as user inputs, may be configured to present detailed information in risk management dashboard 702. As an example, an interface portion associated with interactive element 731 may, if selected, cause presentation of a detailed view of a number of accounts associated with levels of risk, such as depicted in FIG. 9 (e.g., upon selecting interactive element 731). Also, risk management dashboard 702 may include inputs 707 and 708 to filter business data at risk as a function of an account or any other filter. Further, risk management dashboard 702 may include a user input 709 to present a tabular view of business function data at risk.

Figures 8A, 8B:
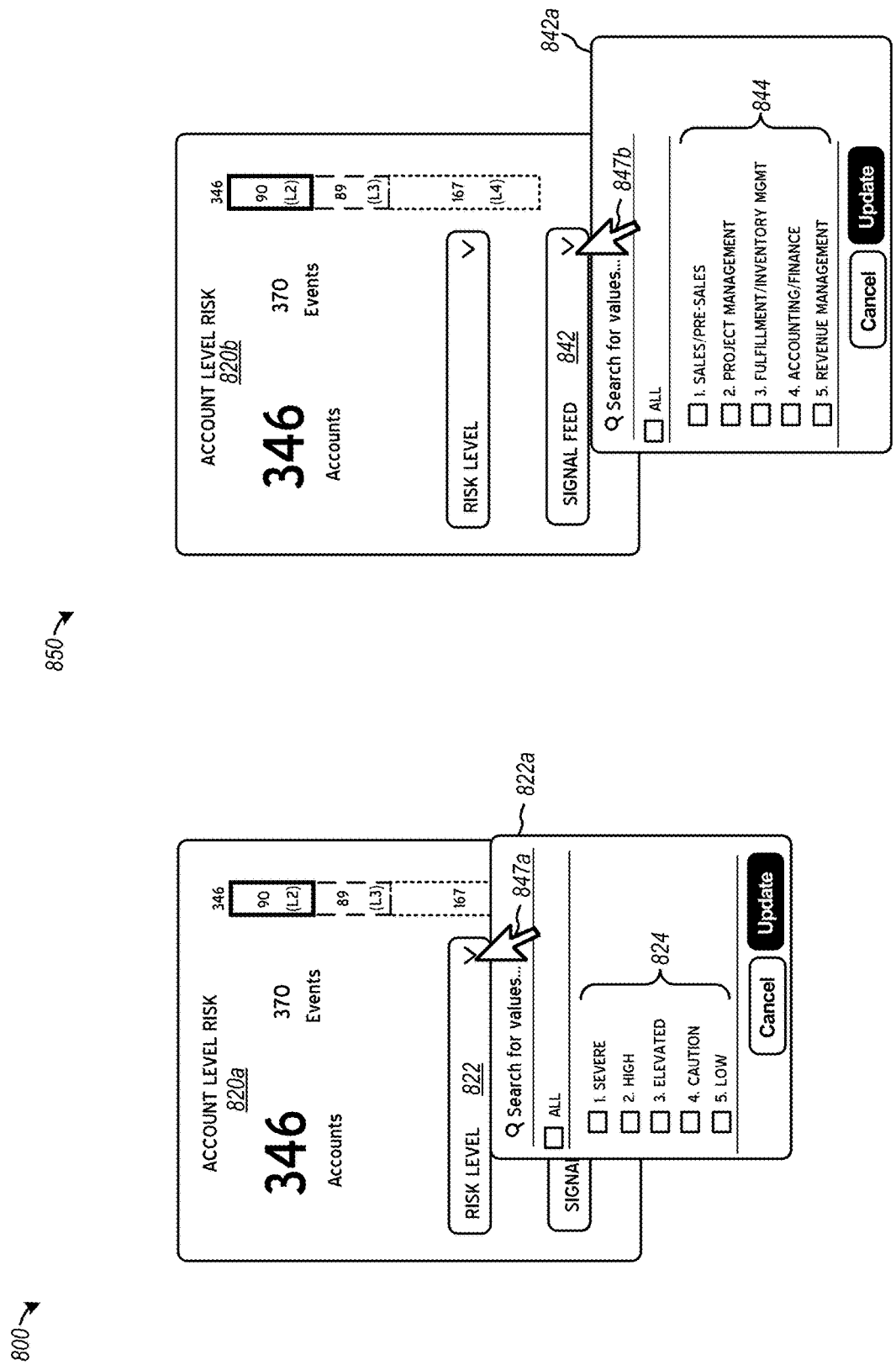
FIGS. 8A and 8B are diagrams depicting examples of interface portion functionality associated with a risk management engine, according to some examples.

FIGS. 8A and 8B are diagrams depicting examples of interface portion functionality associated with a risk management engine, according to some examples. Diagram 800 depicts a portion 820*a* of a user interface configured to filter data for presentation as a function of risk level. For example, selection of user interface portion 822 by selector 847*a* may be configured to present a menu 822*a* of user inputs 824, each of which may be configured extract or fetch business-related data as a function of a particular risk level. Diagram 850 depicts a portion 820b of a user interface configured to filter data for presentation as a function of business function and/or source of risk data signal (e.g., via a data feed). For example, selection of user interface portion 842 by selector 847b may be configured to present a menu 842a of user inputs 844, each of which may be configured extract or fetch business-related data (e.g., re-aggregated data) as a function of a particular business function, role, metric, or attribute.

FIG. 9 is a diagram depicting another example of a risk management dashboard configured to present enhanced details of risk, according to some examples. Diagram 900 depicts a risk management dashboard 902 configured to present granular risk data in a user interface 901, according to one or more techniques and/or processes described herein. As shown, elements 951a to 951c depict relative proportions of business function data associated with different levels of risk. Further, diagram 900 depicts account level risk data 962 associated with other business data 961 and 963, and also depicts event level risk data 973 associated with other business data 971, 975, 977, and 979.

FIG. 10 is a diagram depicting an example of a risk management dashboard configured to present multiple views of enhanced details of risk, according to some examples. Diagram 1000 depicts a risk management dashboard 1002 configured to present a first business metric (e.g., Account Level AARR at risk) as a function of risk in dashboard 1002, and present a second business metric (e.g., Financial Accounts Receivable) as a function of risk in dashboard 1052. Elements 1011a to 1011c of dashboard 1002 depict relative proportions of business function data associated with different levels of risk. Further, dashboard 1002 depicts account level risk data 1022 associated with other business data 1021 and 1023, and also depicts account level risk data 1026 associated with other business data 1024, 1025, and 1027. Elements 1051a to 1051b of dashboard 1052 depict relative proportions of business function data associated with different levels of risk. Also, dashboard 1052 depicts account level risk data 1072 associated with other business data 1071 and 1073 to 1075.

FIG. 11 is a diagram depicting an example of a risk management dashboard implemented in a user interface, according to some examples. Diagram 1100 depicts a user interface 1101 that includes a risk management dashboard 1102, which may be configured to include a risk level and mappings interface portion 1110, an account level risk summary interface portion 1120, and an executive summary interface portion 1130, which presents financially-related information affected by a risk event. Risk level and mappings interface portion 1110 is shown to include elements 1110a indicating a range of risk levels (e.g., from "low" to "severe"), and well as associated components or dimensions of risk data signals 1110b, such as dimensions 1111 to 1115 (which may be mapped to a corresponding risk level of elements 1110a). Note that each risk level is shown and distinguished by different line styles (e.g., line dash sizes, shading, thickness, etc.).

Account level risk summary interface portion 1120 may be configured to depict and provide additional functionality in association with a number of accounts and a number of events. In this example, account level risk summary interface portion 1120 may include a user input 1122 configured to present business-related data as a function of risk level (e.g., see FIG. 13), whereas a user input 1124 may be configured to present business-related data as a function of a source of a data feed (e.g., sales) and a risk level value. Executive summary interface portion 1130 may be configured to depict a number of interactive elements 1131 to 1133, each of which may convey information regarding impact of a risk event on various business functions and attributes. In this example, each of interactive elements 1131 to 1133 may include interactive user interface portions that, as user inputs, may be configured to present detailed information in risk management dashboards 1102 and 1152.

As an example, an interface portion associated with interactive element 1133 may, if selected, may cause presentation of a detailed view accounts associated with levels of risk, such as depicted in dashboard 1152 (e.g., upon selecting interactive element 1133). As shown, risk management dashboard 1152 may depict granular risk data associated with element 1133 to specify corresponding account names 1171 (e.g., "ACME"), event names 1172, risk levels 1173, and sum of amounts ($) 1174. Further, dashboard 1152 may also include interactive interface elements 1151a to 1151c to depict relative proportions of business function data associated with different levels of risk. Also, dashboard 1152 may depict account level risk data 1162 associated with other business data 1161 and 1163.

Figure 12:
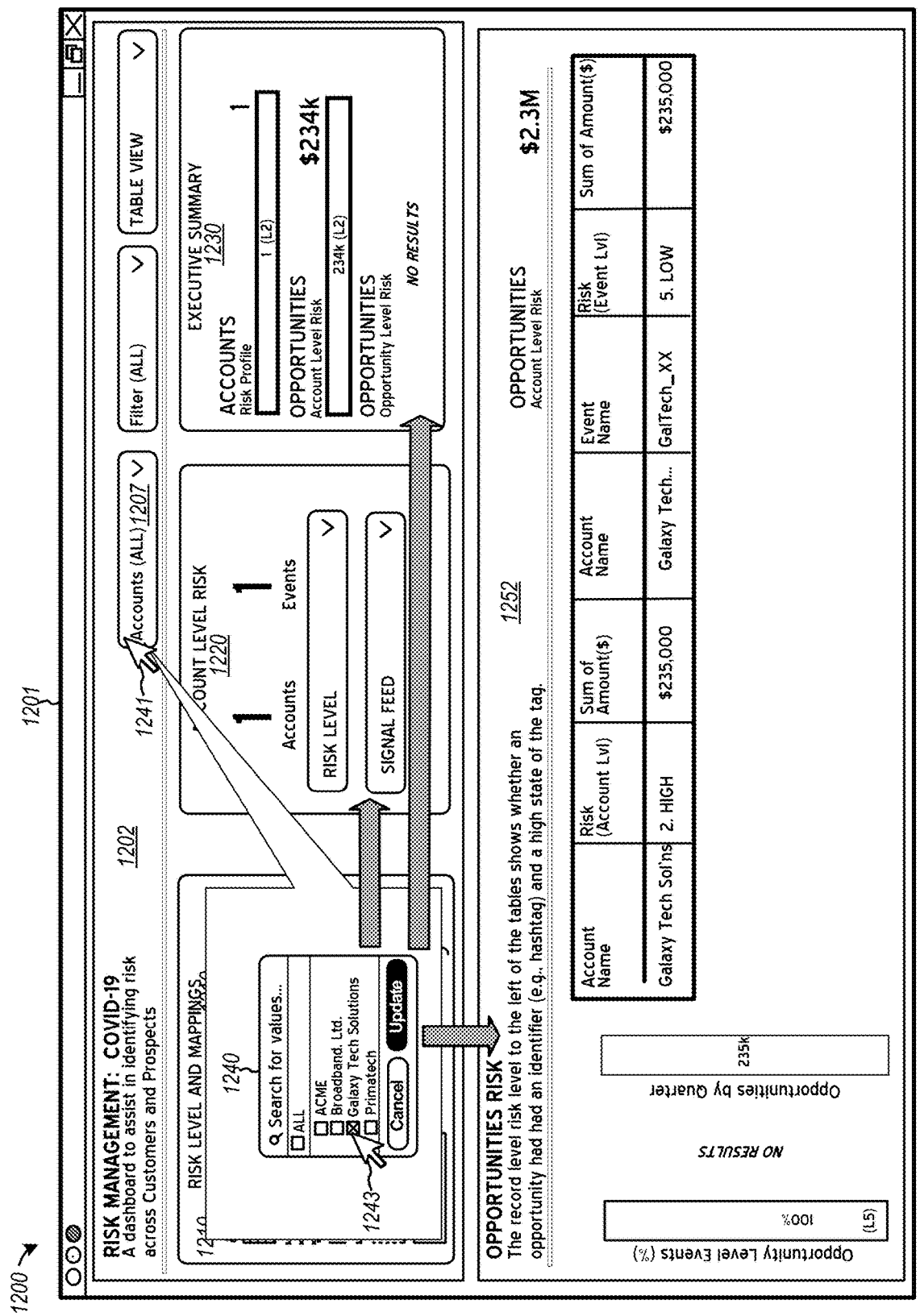
FIG. 12 is a diagram depicting an example of a risk management dashboard configured to access granular risk data regarding an account, according to some examples.

FIG. 12 is a diagram depicting an example of a risk management dashboard configured to access granular risk data regarding an account, according to some examples. Diagram 1200 depicts a user interface 1201 that includes a risk management dashboard 1202, which may be configured to include a risk level and mappings interface portion 1210, an account level risk summary interface portion 1220, and an executive summary interface portion 1230. In the example shown, selector 1241 may be configured to activate user input 1207, which, in turn, generates a set of user inputs 1240 that may be configured to enable additional user input to drill down and provide more detailed information regarding risk data. As shown, selector 1243 may select "Galaxy Tech Solutions," and in response, a risk management engine application (not shown) may be configured to update various portions of user interface 1201. As shown, account level risk summary interface portion 1220, executive summary interface portion 1230, and dashboard 1252 may be updated to provide focus to risk-related information for a specific account (i.e., Galaxy Tech Solutions).

Figure 13:
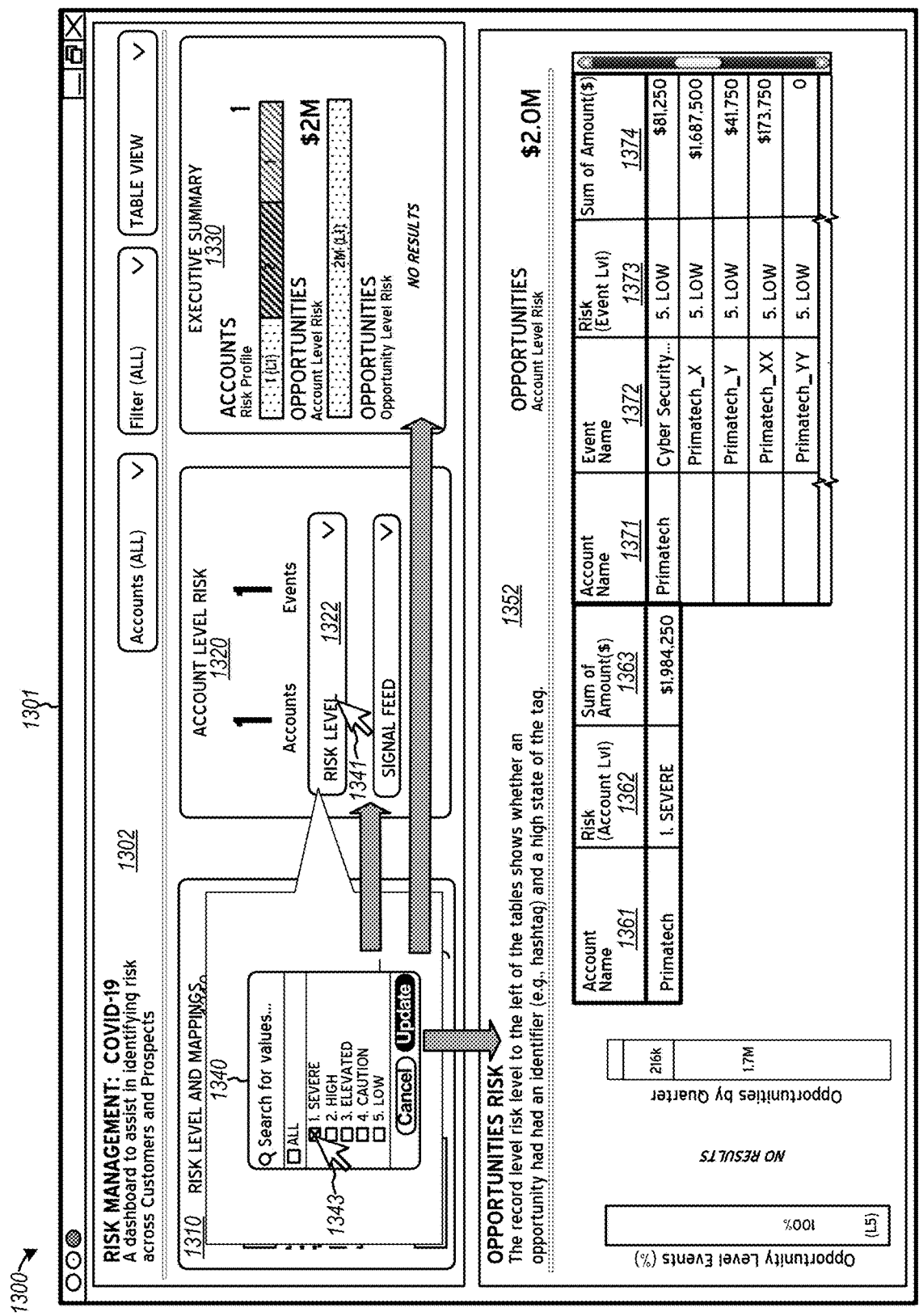
FIG. 13 is a diagram depicting an example of a risk management dashboard configured to access granular enterprise data regarding a level of risk, according to some examples.

FIG. 13 is a diagram depicting an example of a risk management dashboard configured to access granular enterprise data regarding a level of risk, according to some examples. Diagram 1300 depicts a user interface 1301 that includes a risk management dashboard 1302, which may be configured to include a risk level and mappings interface portion 1310, an account level risk summary interface portion 1320, and an executive summary interface portion 1330. In the example shown, selector 1341 may be configured to activate user input 1322, which, in turn, may be configured to generate a set of user inputs 1340 that may be configured to drill down and provide more detailed information regarding business data associated with a specific risk level. As shown, selector 1343 may select a "SEVERE" risk level, and in response, a risk management engine application (not shown) may be configured to update various portions of user interface 1301. As shown, account level risk summary interface portion 1320, executive summary interface portion 1330, and dashboard 1352 are updated to provide focus to any account associated with a SEVERE risk level. As shown, an account "Primatech," which is associated with data representing account name 1361, is shown to be associated with a SEVERE risk level 1362. Dashboard 1352 also depicts ancillary business data in interface portions 1363 to 1374.

FIG. 14 is a diagram depicting an example of a risk management dashboard configured to present enterprise data in a tabular format as a function of risk, according to some examples. Diagram 1400 depicts a user interface 1401 that includes risk management dashboards 1403 and 1452 depicting tabular views of risk data responsive to an activation of user input 1409. Risk management dashboard 1403 may be configured to include various subsets of data 1421 to 1424 as a function of risk, and risk management dashboard 1452 may be configured to include various subsets of data 1461 to 1464 as a function of risk.

FIG. 15 is a diagram depicting an example of a risk management engine configured to predictively determine a risk event, according to some examples. Diagram 1500 depicts a risk management engine 1510 including a predictive engine 1516, which, turn, may include a risk analyzer 1517. Predictive engine 1516 may be configured to predictively or probabilistically compute and determine a risk event, and may also predictively or probabilistically compute and determine a corresponding risk level. In various examples, predictive engine 1516 may be configured to implement one or more algorithms in accordance with machine learning and/or deep learning techniques. For example, a risk level may be determined based on functionality implementing support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms. In one example, predictive engine 1516 may be configured to determine a risk level based on analyzing one or more patterns of one or more subsets of enterprise datasets (e.g., datasets configured for analysis, for example, over time). In some examples, predictive engine 1516 and/or risk analyzer 1517 may be configured to implement one or more sets of rules disposed in a repository 1515 to identify patterns of data suggestive of a risk event, whereby the one or more sets of rules may be used to identify a risk event and/or a level of risk.

In some examples, predictive engine 1516 may be configured to detect a likely occurrence of a risk event, and risk analyzer 1517 may be configured to determine a corresponding risk level to assign to relative subsets of enterprise data and business function data. As an example, consider that risk management engine 1510 may be configured to monitor enterprise data, such as active usage rates (per 1,000 users), or any other enterprise data. Data relationships 1540 depict active usage rates as a function of time. Further, data relationships 1540 depict a sum of daily active users ("DAU") 1544, a sum of weekly active users ("WAU") 1542, and a sum of monthly active users ("MAU") 1541. Predictive engine 1516 may be configured to detect a drop in weekly active users (e.g., a delta difference "delU" 1560) within a range of time ("delT") 1562 related to an event 1550 (e.g., announcement of COVID-19 lock-down). As such, predictive engine 1516 may be configured to calculate that event 1550 is likely a risk event that may affect one or more business functions of an enterprise. Further, risk management engine 1510 may be configured to generate automatically a risk data signal 1507 that may be injected into data streams of an enterprise (e.g., with "##" specifying an auto-generated risk signal). Thus, members of an enterprise may be informed expeditiously of a pending risk event and may prepare as soon as possible to adjust business practices over any number of business functions. Additionally, logic in an enterprise resource computing platform may be configured to detect an auto-generated risk signal and initiate any number of actions to address a risk event.

Figure 16:
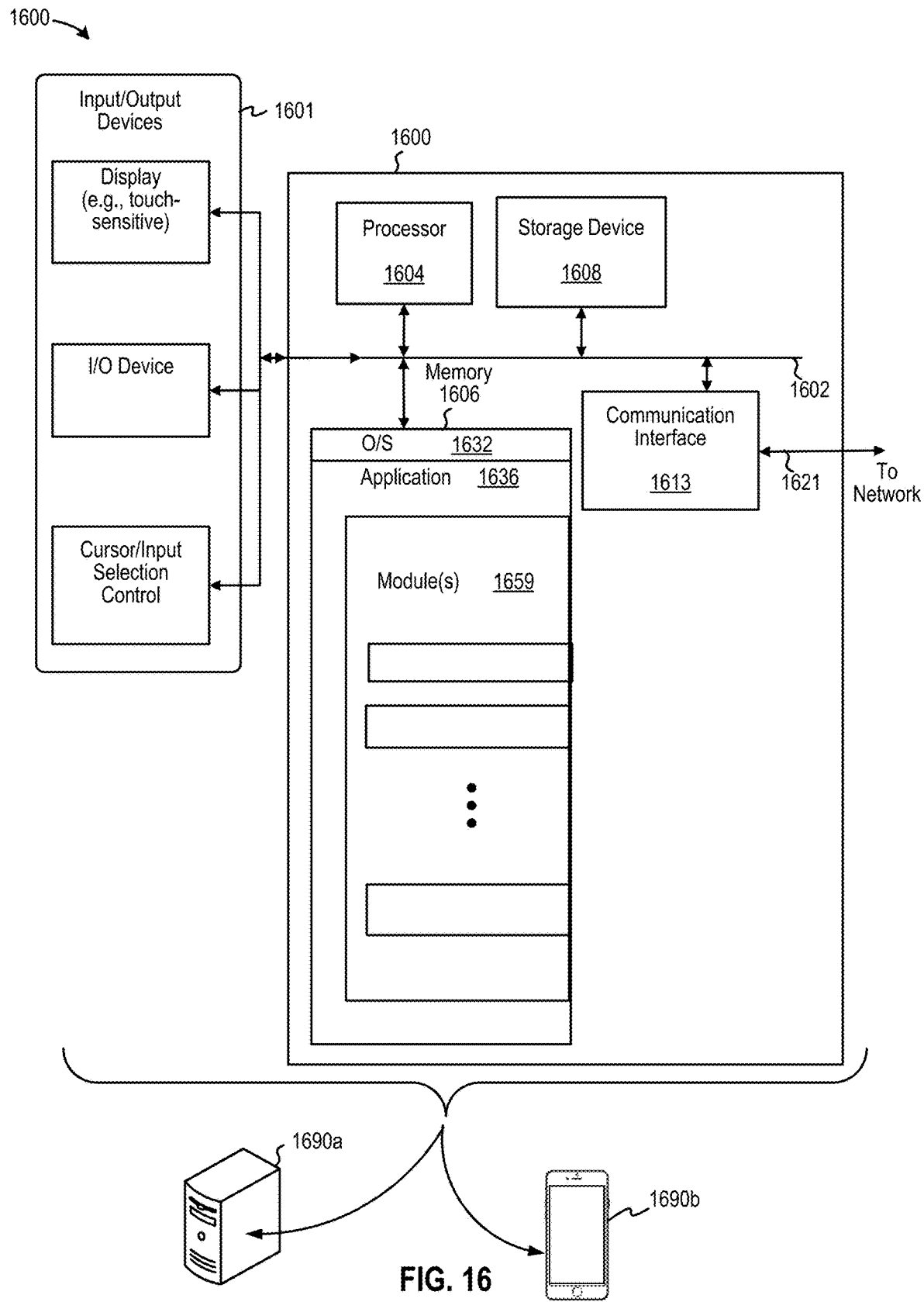
FIG. 16 illustrates examples of various computing platforms configured to provide various functionalities to components of a risk management engine, according to various embodiments.

FIG. 16 illustrates examples of various computing platforms configured to provide various functionalities for managing risk in an enterprise resource computing platform, according to various embodiments.

In some examples, computing platform 1600 may be used to implement computer programs, applications, methods, processes, algorithms, or other software, as well as any hardware implementation thereof, to perform the above-described techniques.

In some cases, computing platform 1600 or any portion (e.g., any structural or functional portion) can be disposed in any device, such as a computing device 1690a, mobile computing device 1690b, and/or a processing circuit in forming structures and/or functions of an above-described apparatus, system, platform or device, according to various examples described herein.

Computing platform 1600 includes a bus 1602 or other communication mechanism for communicating information, which interconnects subsystems and devices, such as processor 1604, system memory 1606 (e.g., RAM, etc.), storage device 1608 (e.g., ROM, etc.), an in-memory cache (which may be implemented in RAM 1606 or other portions of computing platform 1600), a communication interface 1613 (e.g., an Ethernet or wireless controller, a Bluetooth controller, NFC logic, etc.) to facilitate communications via a port on communication link 1621 to communicate, for example, with a computing device, including mobile computing and/or communication devices with processors, including database devices (e.g., storage devices configured to store atomized datasets, including, but not limited to triplestores, etc.). Processor 1604 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1600 exchanges data representing inputs and outputs via input-and-output devices 1601, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1601 may be implemented as, or otherwise substituted with, a user interface in a computing device associated with a user account identifier in accordance with the various examples described herein.

According to some examples, computing platform 1600 performs specific operations by processor 1604 executing one or more sequences of one or more instructions stored in system memory 1606, and computing platform 1600 can be implemented in a client-server arrangement, peer-to-peer arrangement, or as any mobile computing device, including smart phones and the like. Such instructions or data may be read into system memory 1606 from another computer readable medium, such as storage device 1608. In some examples, hard-wired circuitry may be used in place of or in combination with software instructions for implementation. Instructions may be embedded in software or firmware. The term "computer readable medium" refers to any tangible medium that participates in providing instructions to processor 1604 for execution. Such a medium may take many forms, including but not limited to, non-volatile media and volatile media. Non-volatile media includes, for example, optical or magnetic disks and the like. Volatile media includes dynamic memory, such as system memory 1606.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1602 for transmitting a computer data signal.

In some examples, execution of the sequences of instructions may be performed by computing platform 1600. According to some examples, computing platform 1600 can be coupled by communication link 1621 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1600 may transmit and receive messages, data, and instructions, including program code (e.g., application code) through communication link 1621 and communication interface 1613. Received program code may be executed by processor 1604 as it is received, and/or stored in memory 1606 or other non-volatile storage for later execution.

In the example shown, system memory 1606 can include various modules that include executable instructions to implement functionalities described herein. System memory 1606 may include an operating system ("O/S") 1632, as well as an application 1636 and/or logic module(s) 1659. In the example shown, system memory 1606 may include any number of modules 1659, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1659, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1659 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1659 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 1659 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term (e.g., engine) that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS").

Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:
1. A user interface f or selecting and presenting business related risk levels comprising:
 a graphical user interface (GUI) comprising:
  a first drop-down menu for selecting one or more business accounts;
  a second drop-down menu f or selecting a source data feed;
  at least a first user interface portion configured to activate a first user input, from an enterprise resource computing platform, to present business-related data as of unction of a risk level in response to and associated with the first drop-down menu selection of the one or more business accounts, the first user interface portion configured in a standardized format; and a second user interface portion configured to activate a second user input to present business-related data as a function of a source of a data feed in response to the second drop-down menu selection of the source data feed and the risk level, the second user interface portion configured in the standardized format;

the graphical user interface displaying one or more sets of data being determined by a method comprising:

monitoring a data stream received by the enterprise resource computing platform for detection of a risk data signal, the risk data signal being based on keyword identification of at least one portion of text in the data stream, the risk data signal being associated with a business data object, the business data object being associated with a hierarchical business data object, the risk data signal including strings of concatenated portions of the risk data signal comprising a first portion of the risk data signal including the risk level for classifying the risk data signal, and a second portion of the risk data signal being configured for mapping the risk level to business function data;

detecting, by the enterprise resource computing platform, the risk data signal from the data stream by extracting keywords from the data stream using natural language processing (NLP);

identifying one or more portions of the concatenated portions of the risk data signal;

computing, by the enterprise resource computing platform, the risk level of data of the risk data signal based on at least one portion of the identified portions of the risk data signal;

classifying data of the risk data signal associated with the hierarchical business data object as being at the computed risk level;

aggregating the classified data associated with the hierarchical business data object with other data associated with other hierarchical business data objects classified as being at the computed risk level to form aggregated data;

converting, by the enterprise resource computing platform, a subset of the aggregated data at the computed risk level into the standardized format for presenting in the graphical user interface; and executing instructions for presenting within the graphical user interface the subset of the aggregated data at the computed risk level in the standardized format in response to user selections of the first drop-down menu and the second drop-down menu.

2. The user interface of claim 1 wherein the hierarchical business data object is an account data object associated with a plurality of business data objects including the business data object.

3. The user interface of claim 1 wherein monitoring a data stream received by the enterprise resource computing platform for detection of the risk data signal associated with the business data object comprises:

receiving data associated with the business data object as unstructured data.

4. The user interface of claim 1 wherein monitoring a data stream received by the enterprise resource computing platform for detection of the risk data signal associated with the business data object comprises:

identifying data representing an electronic message.

5. The user interface of claim 4 wherein identifying the data representing the electronic message comprises:

identifying data associated with a data feed object.

6. The user interface of claim 4 further comprising:

filtering the data representing the electronic message; and detecting data representing the risk data signal.

7. The user interface of claim 1 wherein identifying the one or more portions of the concatenated portions of the risk data signal comprises:

identifying a third portion specifying a risk event.

8. The user interface of claim 1 wherein identifying the one or more portions of the concatenated portions of the risk data signal comprises:

identifying one or more symbols indicative of data subject to a risk event.

9. The user interface of claim 1, wherein computing the risk level comprises normalizing data representing multiple risk levels based on a plurality of risk data signals from multiple data sources.

10. The user interface of claim 1 wherein detection of the risk data signal associated with the business data object comprises:

identifying data associated with a business function data object.

11. The user interface of claim 1 wherein converting the subset of the aggregated data comprises:

executing a risk management dashboard application configured to generate a presentation format for display at the graphical user interface.

12. The user interface of claim 1 wherein executing instructions for presenting within the graphical user interface the subset of the aggregated data comprises:

causing presentation of the subset of the aggregated data at the computed risk level relative to one or more other risk levels associated with other subsets of other aggregated data.

13. The user interface of claim 1 wherein executing instructions for presenting within the graphical user interface the subset of the aggregated data comprises:

causing presentation of the subset of the aggregated data at the risk level as an interactive portion of the graphical user interface.

14. The user interface of claim 13 further comprising:

receiving data representing a user input responsive to activation of the interactive portion of the user interface; and executing instructions for presenting within the graphical user interface another subset of the aggregated data at the computed risk level or another subset of other aggregated data at another risk level.

15. The user interface of claim 1, wherein the source data feed comprises one or more of sales, project management, fulfillment, accounting, finance, revenue management, and procurement data in the enterprise resource computing platform.

16. A system for presenting business related risk levels comprising:

a memory including executable instructions; and a processor, responsive to executing the instructions, configured to:

instantiate a user interface comprising:

a graphical user interface (GUI) comprising:

a first drop-down menu for selecting one or more business accounts;

a second drop-down menu for selecting a source data feed;

at least a first user interface portion configured to activate a first user input, from an enterprise resource computing platform, to present business-related data as a function of a risk level, the first user interface portion configured in a standardized format; and a second user interface portion configured to activate a second user input to present business-related data as a function of a source of a data feed and the risk level in response to and associated with the first drop-down menu selection of the one or more business accounts, the second user interface portion configured in the standardized format;

the graphical user interface displaying one or more sets of data being determined by a method comprising:

monitoring a received data stream for detection of a risk data signal, the risk data signal being based on keyword identification of at least one portion of text in the data stream, the risk data signal being associated with a business data object, the business data object being associated with a hierarchical business data object, the risk data signal including strings of concatenated portions of the risk data signal comprising a first portion of the risk data signal including the risk level for classifying the risk data signal, and a second portion of the risk data signal being configured for mapping the risk level to business function data;

detecting, by the enterprise resource computing platform, the risk data signal from the data stream by extracting keywords from the data stream using natural language processing (NLP);

identifying one or more portions of the concatenated portions of the risk data signal;

computing, by the enterprise resource computing platform, the risk level of data of the risk data signal based on at least one portion of the identified portions of the risk data signal;

classifying data of the risk data signal associated with the hierarchical business data object as being at the computed risk level;

aggregating the data associated with the hierarchical business data object with other data associated with other hierarchical business data objects classified as being at the computed risk level to form the aggregated data;

converting, by the enterprise resource computing platform, a subset of the aggregated data at the computed risk level into the standardized format for presenting in the graphical user interface; and executing instructions for presenting within the graphical user interface the subset of the aggregated data at the computed risk level in the standardized format in response to user selections of the first drop-down menu and the second drop-down menu.

17. The system of claim 16 wherein a subset of the instructions configured to receive the risk data signal is further configured to cause the processor to:
identify data associated with a data feed object.

18. The system of claim 16 wherein a subset of the instructions configured for converting the subset of the aggregated data is further configured to cause the processor to:
execute a risk management dashboard application configured to generate a presentation format for display at the graphical user interface.

19. The system of claim 16 wherein a subset of the instructions further causes the processor to:
compute multiple risk levels associated with multiple subsets of the aggregated data.

20. The system of claim 16, wherein the source data feed comprises one or more of sales, project management, fulfillment, accounting, finance, revenue management, and procurement data in the enterprise resource computing platform.

21. A method for presenting business related risk levels comprising:

instantiating a graphical user interface (GUI) comprising:
a first drop-down menu for selecting one or more business accounts; and
a second drop-down menu f or selecting a source data feed;

selecting one or more business accounts from the first drop-down menu;

selecting a source data feed;

monitoring a data stream received by an enterprise resource computing platform for detection of a risk data signal, the risk data signal being based on keyword identification of at least one portion of text in the data stream, the risk data signal being associated with a business data object, the business data object being associated with a hierarchical business data object, the risk data signal including strings of concatenated portions of the risk data signal comprising a first portion of the risk data signal including the risk level for classifying the risk data signal, and a second portion of the risk data signal being configured for mapping the risk level to business function data;

detecting, by the enterprise resource computing platform, the risk data signal from the data stream by extracting keywords from the data stream using natural language processing (NLP);

identifying one or more portions of the concatenated portions of the risk data signal;

computing, by the enterprise resource computing platform, the risk level of data of the risk data signal based on at least one portion of the identified portions of the risk data signal;

classifying data of the risk data signal associated with the hierarchical business data object as being at the computed risk level;

aggregating the classified data associated with the hierarchical business data object with other data associated with other hierarchical business data objects classified as being at the computed risk level to form aggregated data;

converting, by the enterprise resource computing platform, a subset of the aggregated data at the computed risk level into a standardized format for presenting in a user interface; and executing instructions for presenting within the graphical user interface the subset of the aggregated data at the computed risk level in the standardized format in response to user selections of the first drop-down menu and the second drop-down menu.

\* \* \* \* \*